United States Patent [19]

Satoh et al.

[11] Patent Number: 5,617,389

[45] Date of Patent: Apr. 1, 1997

[54] METHOD OF REPRODUCING INFORMATION OF OPTICAL DISC, METHOD OF RECORDING AND REPRODUCING THE SAME, APPARATUS FOR REPRODUCING THE SAME, AND LIGHT DETECTING APPARATUS USED IN THE REPRODUCING APPARATUS

[75] Inventors: Makoto Satoh; Hiroyuki Nakajima, both of Tokorozawa, Japan

[73] Assignee: Pioneer Electronic Corporation, Tokyo, Japan

[21] Appl. No.: 593,542

[22] Filed: Jan. 29, 1996

Related U.S. Application Data

[63] Continuation of Ser. No. 255,473, Jun. 8, 1994, abandoned.

[30] Foreign Application Priority Data

Jun. 8, 1993 [JP] Japan .................................. 5-137690

[51] Int. Cl.$^6$ ..................................................... G11B 7/09
[52] U.S. Cl. ..................................... 369/44.42; 369/44.26; 369/111; 369/275.4; 250/201.5
[58] Field of Search .......................... 369/44.41, 44.42, 369/44.14, 44.23, 44.24, 111, 112, 59, 120, 44.26, 275.3, 275.4; 250/201.5

[56] References Cited

U.S. PATENT DOCUMENTS

| | | | |
|---|---|---|---|
| 4,585,933 | 4/1986 | Ando | 369/44.24 X |
| 4,742,218 | 5/1988 | Nakamura et al. | 250/201.5 |
| 5,357,499 | 10/1994 | Nomoto | 369/120 |
| 5,359,591 | 10/1994 | Nomoto | 369/275.3 X |

FOREIGN PATENT DOCUMENTS 0069534  4/1982  Japan ................................. 369/44.42

*Primary Examiner*—Thang V. Tran
*Attorney, Agent, or Firm*—Kane, Dalsimer, Sullivan, Kurucz, Levy, Eisele and Richard, LLP

[57] ABSTRACT

An optical disc has a recording surface on which a spiral track having a predetermined track pitch is formed. A plurality of information units are formed on the track each of which has a predetermined unit length in a circumferential direction and a radial direction of the optical disc respectively. The information is converted in a shape and a disposed position of an information pit, which is formed in each of the plurality of information units. A method of reproducing the information includes the steps of: irradiating a reading light to form a light spot on the information pit; detecting an outer light portion, which corresponds to an outer circumferential side domain, among a reflective light shaped in a spot from the information pit, which is projected on an imaginary plane including a light receiving surface of a light detecting apparatus to output a light detection signal indicating the detected outer light portion; and reproducing the information on the basis of the light detection signal.

8 Claims, 25 Drawing Sheets

EDGE OF
INFORMATION PIT : 0.30μm

DEPTH OF
INFORMATION PIT : 0.06μm

WAVELENGTH : 0.78μm

NA OF OBJECTIVE : 0.45

(□ OR ■ : INFORMATION PIT PIECE)

FIG. 8

| ξ (μm) | d1' | d2' | d3' | d4' | d5' | d6' | d7' | d8' | SUM' | SUB1' | SUB2' | SUB3' | SUB4' |
|---|---|---|---|---|---|---|---|---|---|---|---|---|---|
| 1.25 | 0.091 | 0.103 | 0.120 | 0.102 | 0.083 | 0.074 | 0.063 | 0.069 | 0.705 | 0.127 | 0.111 | 0.053 | -0.061 |
| 1.20 | 0.087 | 0.100 | 0.117 | 0.104 | 0.084 | 0.075 | 0.062 | 0.064 | 0.693 | 0.123 | 0.117 | 0.067 | -0.043 |
| 1.15 | 0.080 | 0.097 | 0.113 | 0.106 | 0.087 | 0.075 | 0.061 | 0.059 | 0.678 | 0.114 | 0.128 | 0.084 | -0.020 |

FIG. 16

| ℓ (μm) | d1 | d2 | d3 | d4 | d5 | d6 | d7 | d8 | SUM | SUB1 | SUB2 | SUB3 | SUB4 |
|---|---|---|---|---|---|---|---|---|---|---|---|---|---|
| 1.25 | 0.022 | 0.027 | 0.033 | 0.024 | 0.014 | 0.012 | 0.009 | 0.012 | 0.153 | 0.059 | 0.043 | 0.013 | -0.035 |
| 1.20 | 0.021 | 0.026 | 0.032 | 0.024 | 0.015 | 0.013 | 0.009 | 0.011 | 0.151 | 0.055 | 0.043 | 0.017 | -0.029 |
| 1.15 | 0.019 | 0.026 | 0.031 | 0.025 | 0.016 | 0.013 | 0.009 | 0.010 | 0.149 | 0.053 | 0.047 | 0.021 | -0.023 |

METHOD OF REPRODUCING INFORMATION OF OPTICAL DISC, METHOD OF RECORDING AND REPRODUCING THE SAME, APPARATUS FOR REPRODUCING THE SAME, AND LIGHT DETECTING APPARATUS USED IN THE REPRODUCING APPARATUS

This application is a continuation, of application Ser. No. 08/255,473, filed on Jun. 8, 1994, now abandoned.

BACKGROUND OF THE INVENTION

1. Field of the Invention

The present invention is related with an optical disc, an apparatus for reproducing the optical disc and a method of recording and reproducing the optical disc.

2. Description of the Related Art

As shown in FIG. 22, recording music information and image information onto an optical disc 92, is performed by converting it into a signal which has a parameter of pit length of an information pit 91 on an information recording surface 95. An apparatus for reproducing the music information and the image information from this optical disc 92, irradiates a laser light to the information pit 91 so that it may become a light beam spot LS having a predetermined diameter. And, it detects the diffracted and reflected light by a light detecting apparatus, which consists of a photodiode etc., outputs it as an electric signal, and extracts and outputs the recorded music information and the recorded image information from this electric signal, by giving signal conversion contrary to that at the time of recording.

There are a compact disc (CD), a laser vision disc (LVD), etc. as an optical disc used in this manner. In FIG. 22, a reference numeral 93 indicates a substrate which consists of polycarbonate resin etc., and a reference numeral 94 indicates a protection layer.

The information recording density of such an optical disc, is greatly influenced by an interval of the tracks, which are the center lines of the pit arrays of the information pits 91 shown in FIG. 23 i.e. the value of the track pitch $P_1$(=1.6 μm: micrometers), and the value of the diameter of the light beam spot LS of the laser light irradiated onto the information pit 91 (=2.1 μm). Therefore, in order to record more information on a disc, it may be considered to narrow the value of the track pitch from the presently available value.

However, although there arises no problem in examples shown in FIG. 22 and FIG. 23, for example, if a track pitch is set to a value $P_2$ less than the conventional value $P_1$ (for example, $P_2=P_1/2$) as shown in FIG. 24, information pits 91B and 91C etc. of neighboring tracks are included within the range of the beam spot LS of the laser light other than the information pit 91A which should be read. Therefore, under this condition, a crosstalk amount increases and it cannot be practically used.

On the other hand, it may be also considered to further reduce the diameter of the beam spot LS of the laser light. As shown in FIG. 25, a minimum beam diameter w at the time of condensing a laser light having a wavelength λ at the position of a focal length f by an objective lens OL, becomes as a following expression (1).

$$w=1.22 \times \lambda / NA \qquad (1)$$

Here, NA is a numerical aperture of the objective lens OL.

Apart from that, what is necessary is just to make the wavelength λ less or enlarge the numerical aperture NA, in order to make the laser beam diameter w less. As for the wavelength λ of the laser light, the wavelength of a semiconductor laser presently used for the optical disc, is about λ=0.780 μm (μm is $10^{-6}$ m). Moreover, as for the numerical aperture NA, it is about 0.45 in case of the CD. Thus, the minimum value $w_{min}$ of the laser beam diameter, becomes about a value as expressed by a following expression.

$$W_{min}=1.22 \times 0.780/0.45=2.1 \text{ (μm)}$$

Therefore, the minimum track pitch, which does not generate a crosstalk when the laser beam spot is irradiated on a certain pit array, becomes about 1.6 μm, which value is employed by many present optical discs.

Therefore, under the conditions of the laser light wavelength and the lens numerical aperture which are presently used, in order to further improve the information recording density, it becomes necessary to raise the amount of information of each information pit itself.

As one method for this, it may be considered to divide the information pit into two or more information pit pieces, and change the arrangement and combination of the information pit pieces.

In this case, in order to reproduce the record information, it becomes necessary to distinguish the information pit not only as for the presence and the absence but also as for the disposed position of the information pit pieces. For this reason, the influence of the positional offset and the adjacent information pits should be restrained as much as possible. Moreover, with respect to the light detecting apparatus to reproduce the information, a device is requested which can restrain the influence of the positional offset and the adjacent information pit, and can output more accurate detection signal.

In this manner, it is difficult to improve the recording density and at the same time perform a reliable reproducing operation of the optical disc.

SUMMARY OF THE INVENTION

It is therefore an object of the present invention, to provide a method of reproducing information of an optical disc, a method of recording and reproducing the same, an apparatus for reproducing the same, and a light detecting apparatus used in the reproducing apparatus, which can improve the recording density of the optical disc and can perform a reliable reproducing operation.

The above object of the present invention can be achieved by a method of reproducing information of an optical disc. The optical disc has a recording surface on which a spiral track having a predetermined track pitch is formed. A plurality of information units are formed on the track each of which has a predetermined unit length in a circumferential direction and a radial direction of the optical disc respectively. The information is converted in a shape and a disposed position of an information pit, which is formed in each of the plurality of information units. The reproducing method includes the steps of: irradiating a reading light to form a light spot on the information pit; detecting an outer light portion, which corresponds to an outer circumferential side domain, among a reflective light shaped in a spot from the information pit, which is projected on an imaginary plane including a light receiving surface of a light detecting apparatus to output a light detection signal indicating the detected outer light portion; and reproducing the information on the basis of the light detection signal.

According to the reproducing method of the present invention, the reading light shaped in a spot is irradiated onto the information pit. The light detection signal is outputted on the basis of the outer light portion, which corresponds to the outer circumferential side domain among the reflective light projected on the imaginary plane including the light receiving surface. Then, the information is reproduced on the basis of the light detection signal.

Here, the inventors of the present invention have found the following fact after diligent researches. Namely, the inner light portion, which corresponds to the inner circumferential side domain, among the reflective light of the reading light shaped in the spot, which is projected on the imaginary plane including the light receiving surface of the light detecting apparatus, is subjected to the influence of the positional offset of the information pit and the influence of the adjacent information pit, as compared with the outer light portion of the reflective light. This is because the adjacent domain, which should be processed as another domain at the time of distinguishing them from each other, is located close to each other in case of the inner light portion of the reflective light as compared with the case of the outer light portion of the reflective light.

Therefore, the information can be reproduced while restraining the influence of the positional offset and the adjacent information pit, by performing the information reproduction without using the inner light portion of the reflective light which is the most sensitive to the influence of the positional offset and the adjacent information pit.

In this manner, since the influence of the positional offset and the adjacent information pit can be restrained, it becomes possible to perform a reliable reproducing operation. At the same time, the recording density of the information pit can be improved, since the shape and the disposed position of the information pit are used as the record information.

The above object of the present invention can be also achieved by a method of recording and reproducing information of an optical disc. The recording and reproducing method includes the steps of: preparing an optical disc having a recording surface on which a spiral track having a predetermined track pitch is formed, a plurality of information units being formed on the track each of which has a predetermined unit length in a circumferential direction and a radial direction of the optical disc respectively; recording information by converting the information into a shape and a disposed position of an information pit, which is formed in each of the plurality of information units; irradiating a reading light to form a light spot on the information pit; detecting an outer light portion, which corresponds to an outer circumferential side domain, among a reflective light shaped in a spot from the information pit, which is projected on an imaginary plane including a light receiving surface of a light detecting apparatus to output a light detection signal indicating the detected outer light portion; and reproducing the information on the basis of the light detection signal.

Accordingly, the same advantageous effect as the aforementioned reproducing method of the present invention, can be achieved by the recording and reproducing method of the present invention.

The above object of the present invention can be also achieved by a light detecting apparatus for receiving a reflective light shaped in a spot from the above described optical disc of the present invention to which a reading light is irradiated, and outputting a light detection signal to reproduce information of the optical disc. The light detecting apparatus is provided with: a detection device having an N (N: natural number not less than 2) pieces of divided light receiving surfaces, for detecting an outer light portion, which corresponds to an outer circumferential side domain, among a reflective light shaped in a spot from the information pit, which is projected on an imaginary plane including the divided light receiving surfaces; and an output device for outputting a light detection signal indicating the detected outer light portion.

According to the light detecting apparatus of the present invention, the light receiving surface for receiving the reflective light of the reading light, has the N pieces of divided light receiving surfaces, and the light detection signal is outputted on the basis of the outer light portion, which corresponds to the outer circumferential side domain, among the reflective light of the reading light shaped in the spot, which is projected onto the imaginary plane including the divided light receiving surfaces. Thus, the inner light portion of the reflective light is not received, which is the most sensitive to the influence of the positional offset and the adjacent information pit, and that the light detection signal is outputted on the basis of the outer light portion of the reflective light. Consequently, the light detection signal in which the influences of the positional offset and the adjacent information pit are reduced, can be outputted.

The above object of the present invention can be also achieved by an apparatus for reproducing information of the above described optical disc of the present invention. The reproducing apparatus is provided with: a light source for irradiating a reading light to form a light spot on the information pit; a detection device having an N (N: natural number not less than 2) pieces of divided light receiving surfaces, for detecting an outer light portion, which corresponds to an outer circumferential side domain, among a reflective light shaped in a spot from the information pit, which is projected on an imaginary plane including the divided light receiving surfaces to output a light detection signal indicating the detected outer light portion; and a reproduction device for reproducing the information on the basis of the light detection signal.

Accordingly, the same advantageous effect as the aforementioned light detecting apparatus of the present invention, can be achieved by the reproducing apparatus of the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 8 is a table showing calculation results of the light detection signals obtained by an eight divided photodetector of a comparison example;

FIG. 16 is a table for showing calculation results of the light detection signal obtained by the eight divided photodetector of the present embodiment;

DETAILED DESCRIPTION OF THE PREFERRED EMBODIMENTS

Nextly, preferred embodiments of the present invention will be explained with reference to drawings.

Figure 1:
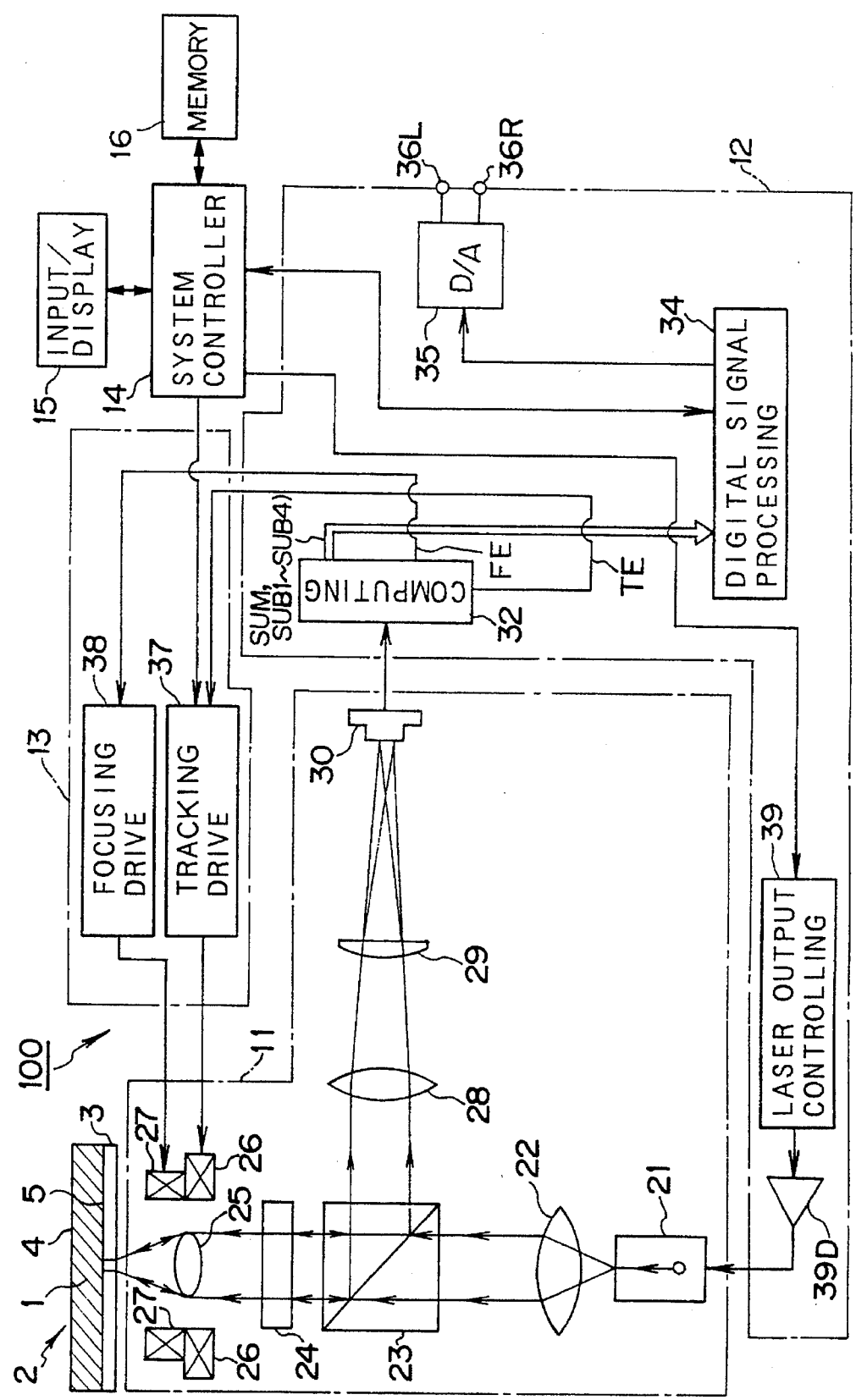
FIG. 1 is a block diagram of an embodiment of the present invention.

FIG. 1 shows an embodiment of an optical disc player of the present invention.

In FIG. 1, an optical disc player 100 includes: an optical pickup 11 for reading information from an optical disc 2 on which an information pit 1 is formed; a signal processing unit 12 for processing the read information signal; a pickup controlling unit 13 for controlling an optical pickup 11; a system controller 14 for performing a general control of the optical disc player 100 on the whole; an inputting and displaying unit 15; and a memory section 16.

The optical pickup 11 includes: a semiconductor laser 21 for generating and irradiating a laser light; a collimator lens 22 for making the irradiated laser light into a parallel beam; a beam splitter 23 for passing the parallel beam; a ¼ wavelength plate 24 for giving an optical path difference of a ¼ wavelength to the parallel beam from the beam splitter 23; an objective lens 25 for condensing the laser light from the ¼ wavelength plate 24 onto an information recording surface 5 of the optical disc 2; a condensing lens 28 for condensing the reflective laser beam, which has been reflected by the reflective film 5 and passed through the objective lens 25 and the ¼ wavelength plate 24, and which optical path has been bent by a right angle at the reflective surface of the beam splitter 23; a cylindrical lens 29 for generating an astigmatism in the reflected laser light from the condensing lens 28; and an eight divided photodetector 30 for receiving the reflected laser light from the cylindrical lens 29. Here, the laser light is irradiated from the bottom side of the optical disc 2.

In FIG. 1, a reference numeral 3 denotes a substrate, and a reference numeral 4 denotes a protection layer of the optical disc 2.

The signal processing unit 12 includes: a computing circuit 32 for receiving the output signal from the eight divided photodetector 30, and giving an predetermined operation to this output signal to output it; a digital signal processing circuit 34 for receiving one of the outputs from the computing circuit 32, giving a digital signal process to it, and demodulating and outputting the information signal; a D/A (Digital to Analog) converter 35 for modulating the digital output from this digital signal processing circuit 34 to an analog signal; output terminals 36L and 36R for the external output of the output from the D/A converter 35; a semiconductor laser driving circuit 39D for driving the semiconductor laser 21; and a laser output controlling circuit 39 for controlling the semiconductor laser driving circuit 39D.

The pickup controlling unit 13 includes: a tracking drive circuit 37 for receiving a tracking error signal TE, which is an output from the computing circuit 32, and controlling a tracking actuator 26; and a focusing drive circuit 38 for controlling a focusing actuator 27 on the basis of a focus error signal FE, which is an output of another side of the computing circuit 32.

Based on the instructions from inputting and displaying unit 15 etc., the system controller 14 controls the digital signal processing circuit 34, the tracking drive circuit 37, and the laser output controlling circuit 39, and transmits and receives data to and from the memory section 16.

Figure 2:
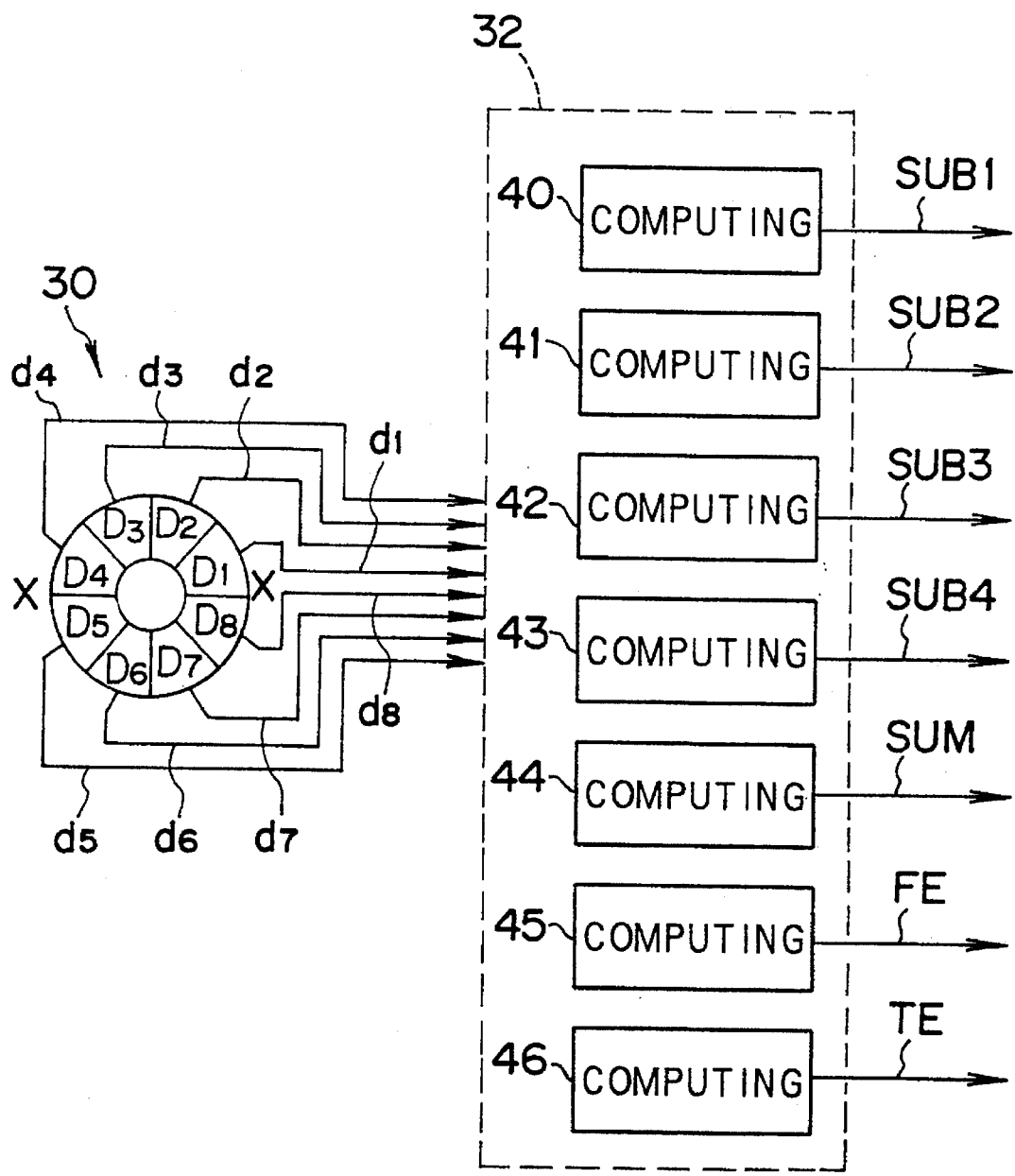
FIG. 2 is a diagram showing detailed constitutions of a light detecting apparatus and a computing circuit of the embodiment.

Nextly, FIG. 2 indicates the constitution, in more detail, of the eight divided photodetector 30 and the computing circuit 32.

As shown in FIG. 2, this eight divided photodetector 30 has eight light receiving areas D1 to D8, which approximately form a circular cylinder shape as a whole. The computing circuit 32 is constituted by connecting information signal computing units 40 to 44, a focus error signal computing unit 45 and a tracking error signal computing unit 46 as in the figure. In this case, from the information signal computing units 40 to 44, information signals SUB1 to SUB4 and SUM are outputted respectively. The focus error signal FE is outputted from the focus error signal computing unit 45. The tracking error signal TE is outputted from the tracking error signal computing unit 46.

Here, the direction of the division line X—X of the eight divided photodetector 30, is in parallel to the direction of the circumference of the disc. The optical system is constituted such that, when the center of the laser spot from the objective lens is irradiated on the center line of one of the tracks, the reflective light spot is incident to be coincident with the center point of the eight divided photodetector.

As shown in FIG. 2, from each of the eight divided light receiving surfaces D1 to D8 of the eight divided photodetector 30, the photo-electrically converted light detection signal d1 to d8 are outputted respectively, and are inputted into the information signal computing units 40 to 44 and the focus error signal computing unit 45, respectively. Here, the information signal computing unit 40 outputs the information signal SUB1 expressed by a following expression (2).

$$SUB1 = d1 + d2 + d3 + d4 - (d5 + d6 + d7 + d8) \quad (2)$$

The information signal computing unit 41 outputs the information signal SUB2 expressed by a following expression (3).

$$SUB2 = d2 + d3 + d4 + d5 - (d6 + d7 + d8 + d1) \quad (3)$$

The information signal computing unit 42 outputs the information signal SUB3 expressed by a following expression (4).

$$SUB3 = d3 + d4 + d5 + d6 - (d7 + d8 + d1 + d2) \quad (4)$$

The information signal computing unit 43 outputs the information signal SUB4 expressed by a following expression (5).

$$SUB4 = d4 + d5 + d6 + d7 - (d8 + d1 + d2 + d3) \quad (5)$$

The information signal computing unit 44 outputs the information signal SUM expressed by a following expression (6).

$$SUM = d1 + d2 + d3 + d4 + d5 + d6 + d7 + d8 \quad (6)$$

The focus error signal computing unit 45 outputs the information signal FE expressed by a following expression (7).

$$FE = d1 + d2 + d5 + d6 - (d3 + d4 + d7 + d8) \quad (7)$$

The tracking error signal computing unit 46 outputs the information signal TE expressed by a following expression (8).

$$TE = d3 + d4 + d5 + d6 - (d7 + d8 + d1 + d2) \quad (8)$$

FIG. 3 indicates a constitution of the optical disc.

Figure 3A:
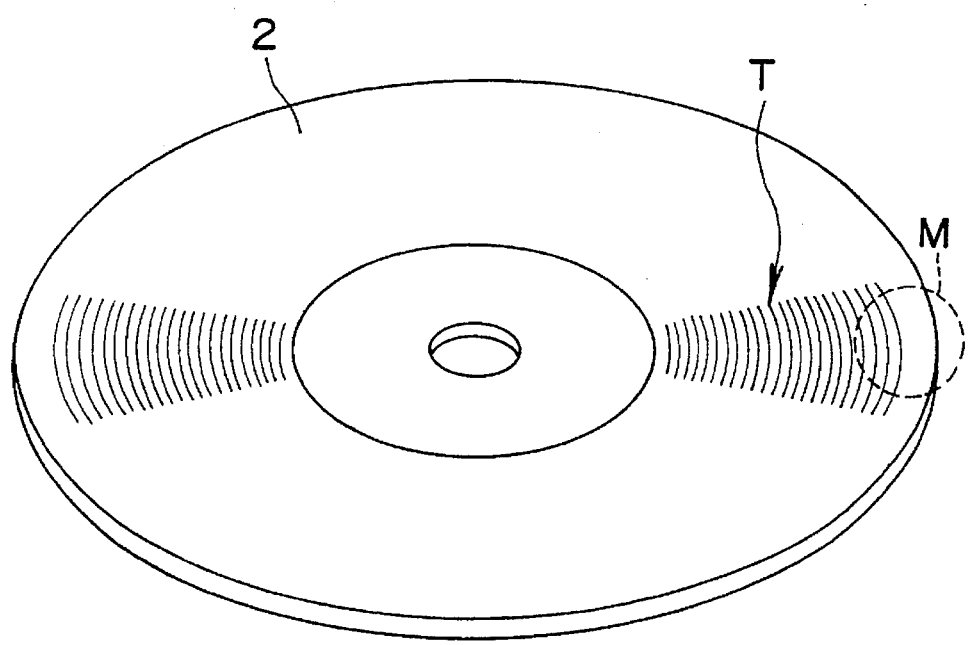
FIG. 3A is a perspective view of an optical disc used in the embodiment.
Figure 3B:
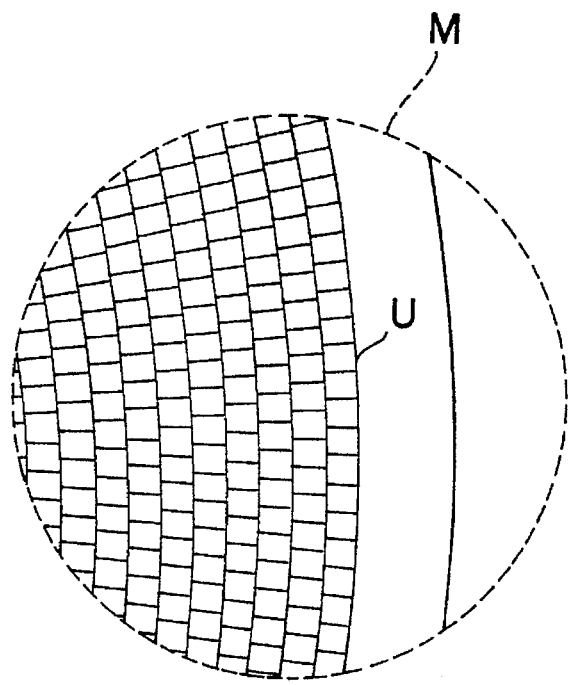
FIG. 3B is a partially enlarged view of the optical disc.

As shown in FIG. 3A, one track T is formed on the optical disc 2, which goes to an outer circumferential side from an inner circumferential side of the optical disc 2 and which is in a spiral shape as a whole. FIG. 3B is an enlarged view of a portion M of the optical disc 2 of FIG. 3A. In FIG. 3B, U indicates an information unit.

Figure 4:
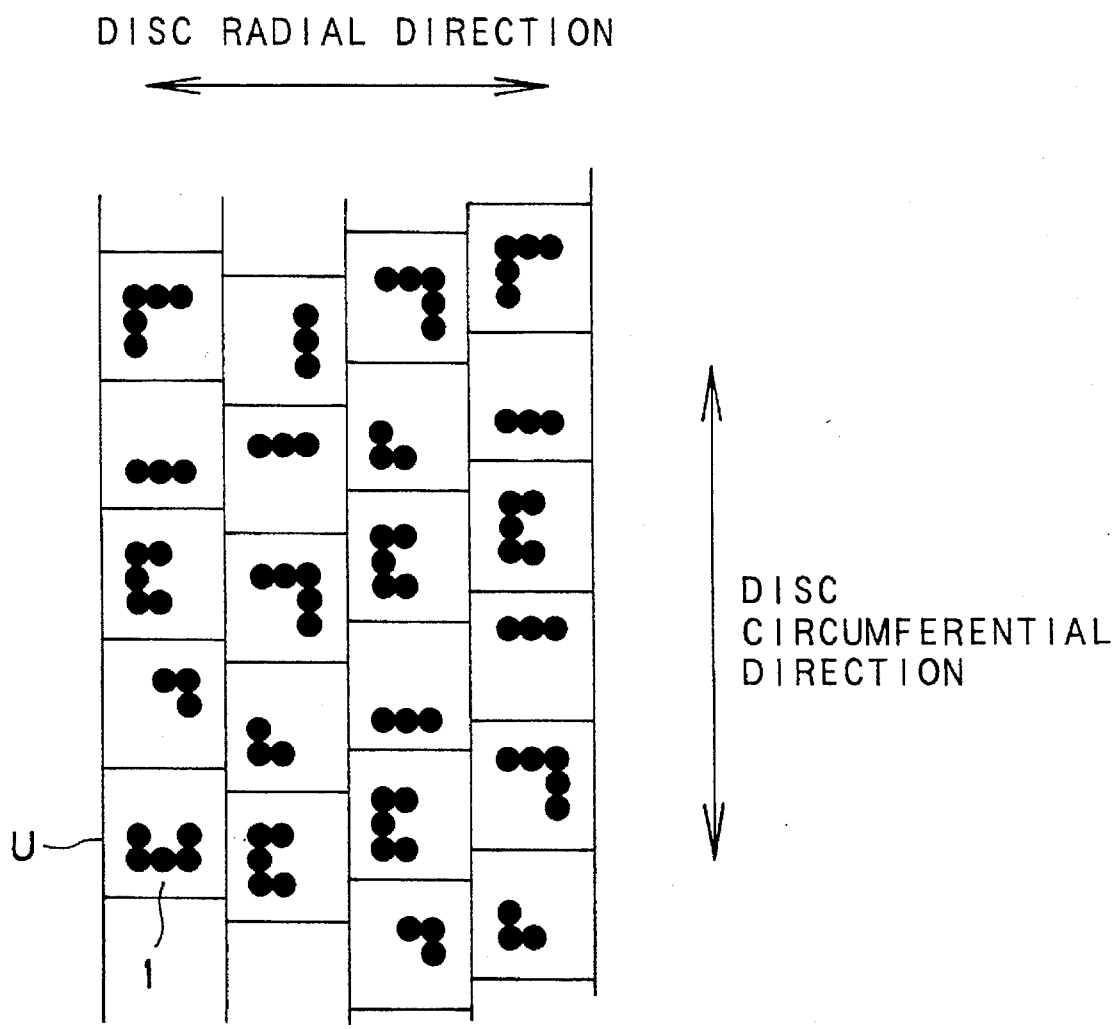
FIG. 4 is a diagram showing a concrete constitution of an information pit formed on the optical disc.

FIG. 4 is an enlarged view, in which the portion M of the optical disc 2 of FIG. 3B is further enlarged. As shown in FIG. 4, the information pit 1 is formed in the inside of the information unit U in a rectangle-like shape. Each information unit U has a predetermined unit length in the circumferential direction of the disc and in the radial direction of the disc, respectively. The information units U are formed such that they are adjacent to each other in the circumferential direction of the disc as illustrated. Here, the information pits have a plurality of different forms according to the combination of the presence and the absence of a plurality of pit pieces. Each of the pit pieces, is disposed at a domain in an approximately square shape, excluding the unit center point, which is the center of the information unit U.

In addition, a shape other than the rectangle-like shape, such as a circle, may be employed for the information unit.

Figure 5A:
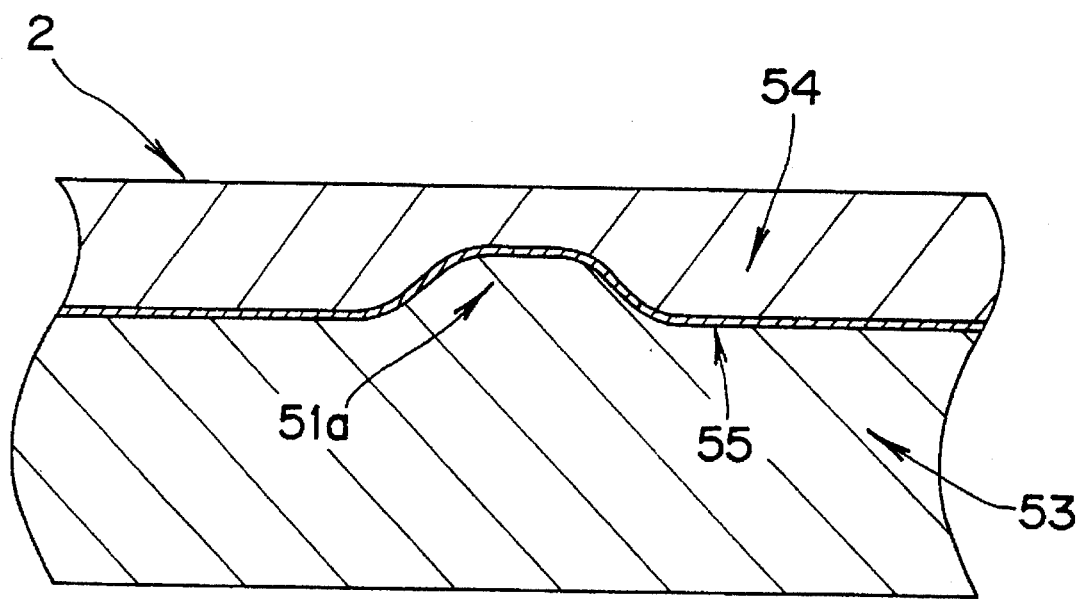
FIG. 5, which consist of FIG. 5A and FIG. 5B, are cross-sectional views of the optical disc.
Figure 5B:
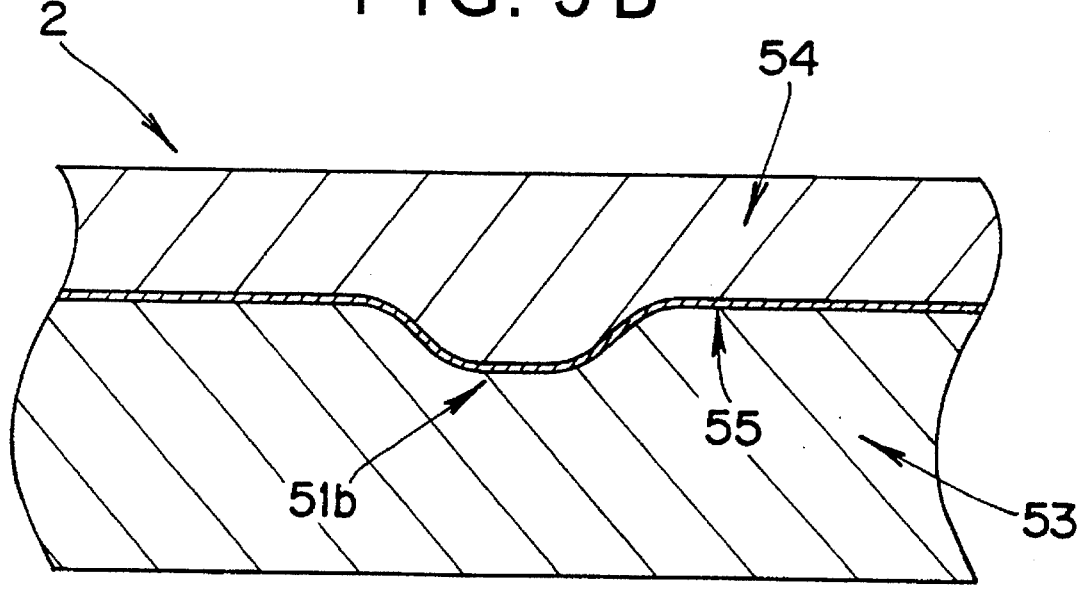

FIG. 5 indicates a cross-sectional figure of the optical disc.

This disc includes: a transparent substrate 53, which comprises polycarbonate resin having a refraction coefficient n, on which a convex section 51a (refer to FIG. 5A) or a concave portion 51b (refer to FIG. 5B) is formed; an information recording surface 55 covering the convex section 51a or the concave portion 51b as well as other flat surface portion by a metal vapor deposited film, such as aluminum; and a protection layer 54 covering this information recording surface 55. Here, the convex section 51a or the concave portion 51b formed by the metal vapor deposited film is equivalent to the pit piece.

Figure 6A:
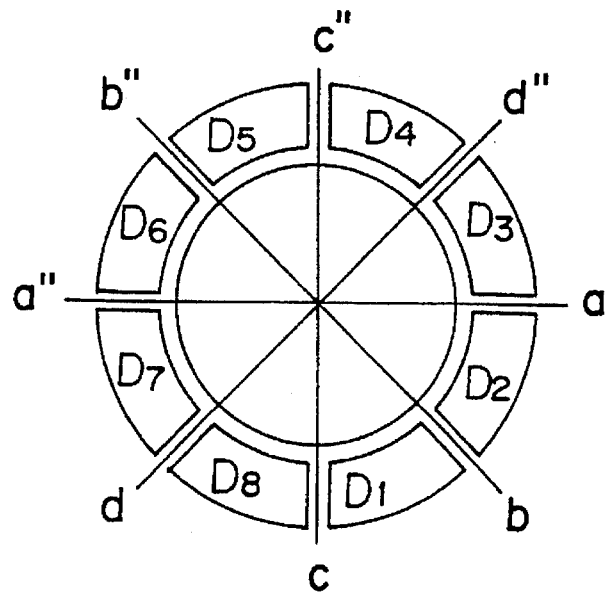
FIG. 6, which consist of FIG. 6A and FIG. 6B, are diagrams for explaining a constitution of an eight divided photodetector of the embodiment.

FIG. 6A show a constitution of the light receiving surface of the eight divided photodetector of the present embodiment in which the eight light receiving areas D1 to D8 are arranged at an outer circumferential side domain of the light receiving surface of the light detecting apparatus.

Before explaining the operation of the eight divided photodetector 30 of the present invention, the problem in an eight divided photodetector of a comparison example according to the aforementioned related art, is explained here.

Figure 6B:
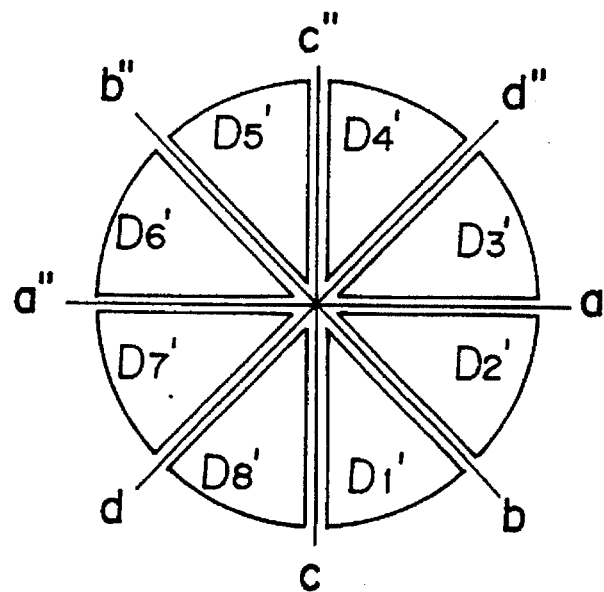

The constitution of the light receiving surface of the eight divided photodetector of the comparison example is shown in FIG. 6B.

In FIG. 6B, The eight divided photodetector 30P of the comparison example, has eight light receiving areas D1' to D8' obtained by dividing a circle by four division lines a—a", b—b", c—c" and d—d".

Figure 7:
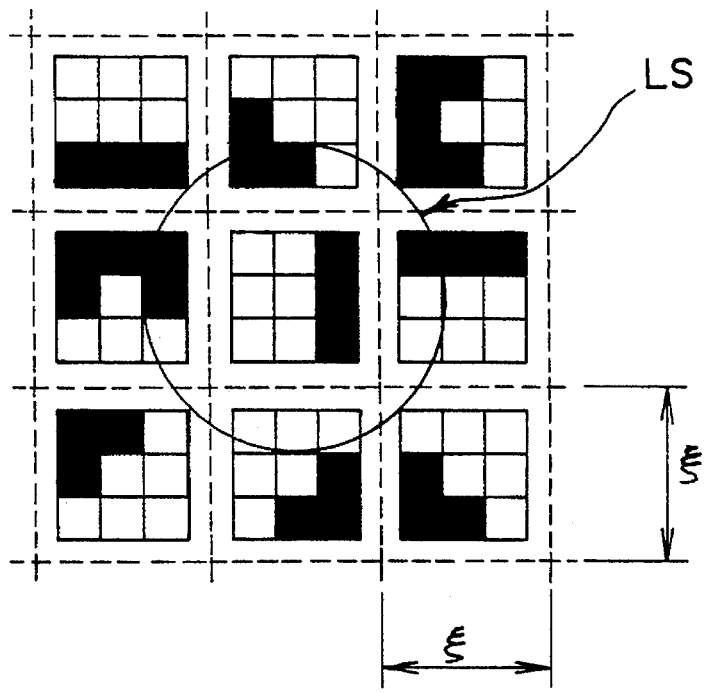
FIG. 7 is a diagram for explaining the relationship between information pit arrangements and a reading beam.

In order to examine the influence of the positional offset with respect to the position of the information pit on the eight divided photodetector 30P, the light detection signal estimated to be outputted by the photodetector 30P, is obtained by a calculation. FIG. 7 indicates the relationship between the information pit arrangement and the reading beam, used for the calculation. FIG. 8 indicates a calculation result. The information pit is formed by the combination of the presence and the absence of the pit piece (0.30×0.30 μm) of the information pit in the domain of 3×3 measures. The information pit used for the calculation of FIG. 8, is a right facing information pit, in which three information pit pieces are arranged in the measures at one vertical sequence on the right hand side, as shown at the center of FIG. 7.

In FIG. 8, d'1 to d'8 represent the light detection signals outputted from the light receiving areas D1' to D8' of FIG. 6B respectively, and SUB'1 to SUB'4 are expressed by following expressions respectively.

$$SUB'1=(d'1+d'2+d'3+d'4)-(d'5+d'6+d'7+d'8)$$

$$SUB'2=(d'2+d'3+d'4+d'5)-(d'6+d'7+d'8+d'1)$$

$$SUB'3=(d'3+d'4+d'5+d'6)-(d'7+d'8+d'1+d'2)$$

$$SUB+4=(d'4+d'8+d'6+d'7)-(d'8+d'1+d'2+d'3)$$

From these results,

1) In case of $\xi=1.25$ μm, since the absolute value |SUB'3| of SUB'3 is the minimum among the absolute values of SUB'1 to SUB'4 and since SUB'1>0, it is distinguished as a right facing information pit.

2) In case of $\xi=1.20$ μm, since the absolute value |SUB'4| of SUB'4 is the minimum among the absolute values of SUB'1 to SUB'4 and since SUB'2>0, it is distinguished as a right facing information pit.

3) In case of $\xi=1.15$ μm, since the absolute value |SUB'4| of SUB'4 is the minimum among the absolute values of SUB'1 to SUB'4 and since SUB'2>0, it is distinguished as a right facing information pit.

Therefore, there arises a problem that, in case of $\xi \leq 1.20$ μm, the information pit is incorrectly distinguished, so that an accurate information reproduction cannot be performed if the recording track pitch is narrowed.

Figure 9:
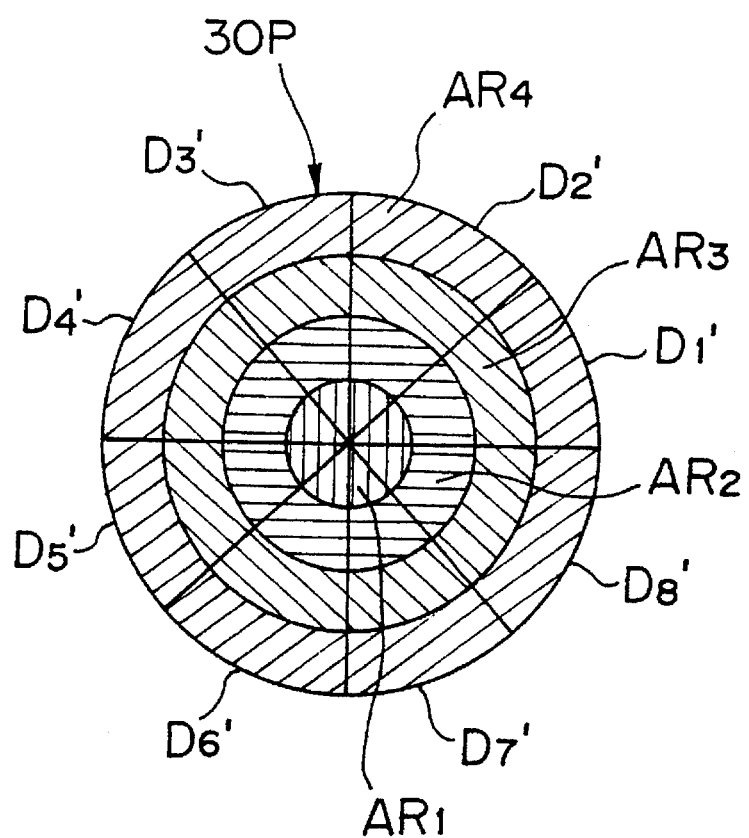
FIG. 9 is a diagram for explaining how to divide domains of the eight divided photodetector of the comparison example.

Thus, in order to examine at which portion of the detector the directional information of the pit is more included, the eight divided photodetector 30P is divided into four domains AR1 to AR4 from the inner circumferential side to the outer circumferential side, as shown in FIG. 9. The distribution of the light intensity of the received light on each of the domains AR1 to AR4 is obtained.

The obtained results are shown in FIG. 10 to FIG. 15. In FIG. 10 to FIG. 15, graphs 100a to 100d, 101a to 101d, . . ., 105a to 105d indicate distributions of the intensity of the received light on each of the domains AR1 to AR4, respectively. It is shown that the intensity of the received light is zero at the center point, and gradually increases toward the outer circumferential side. In addition, in the figures, an arrow indicates the intensity of the received light in a vector manner.

Figure 10:
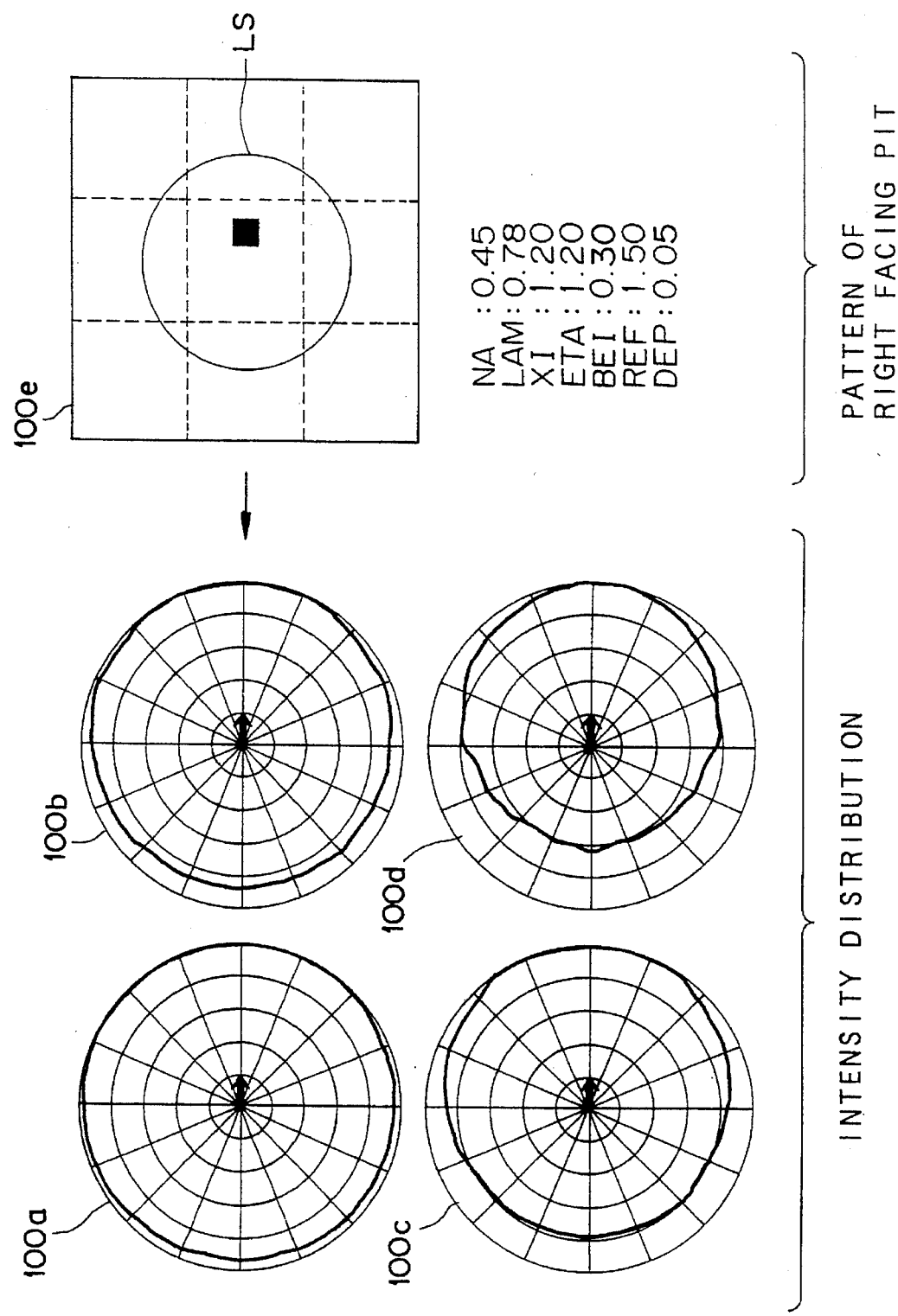
FIG. 10 is a diagram showing a distribution of the light intensity of the received light of every domain of the eight divided photodetector of the comparison example, in case of forming an information pit by one pit piece.

FIG. 10 indicates the distribution of the intensity of the received light in case of forming a pattern 100e of a right facing information pit by one information pit piece. It can be recognized that only rightward intensity is detected strongly as it goes from the domain AR1 (inner circumferential side) toward the domain AR4 (outer circumferential side ).

Figure 11:
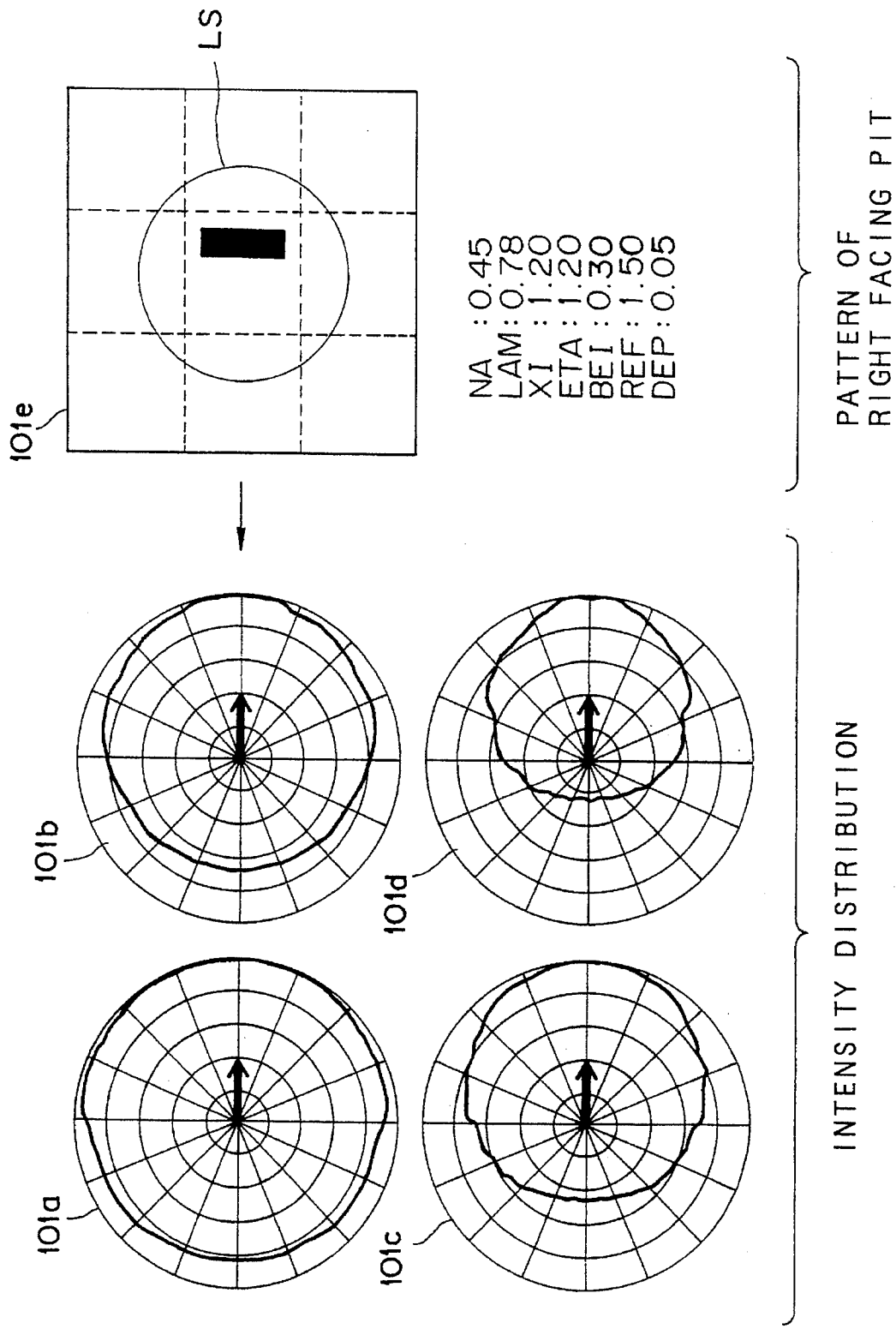
FIG. 11 is a diagram showing a distribution of the light intensity of the received light of every domain of the eight divided photodetector of the comparison example, in case of forming an information pit by three pit pieces.

FIG. 11 indicates the distribution of the intensity of the received light in case of forming a pattern 101e of a right facing information pit by three information pit pieces. It can be recognized that only rightward intensity is detected strongly as it goes from the domain AR1 (inner circumferential side) toward the domain AR4 (outer circumferential side), in the same manner as the case of FIG. 10.

Figure 12:
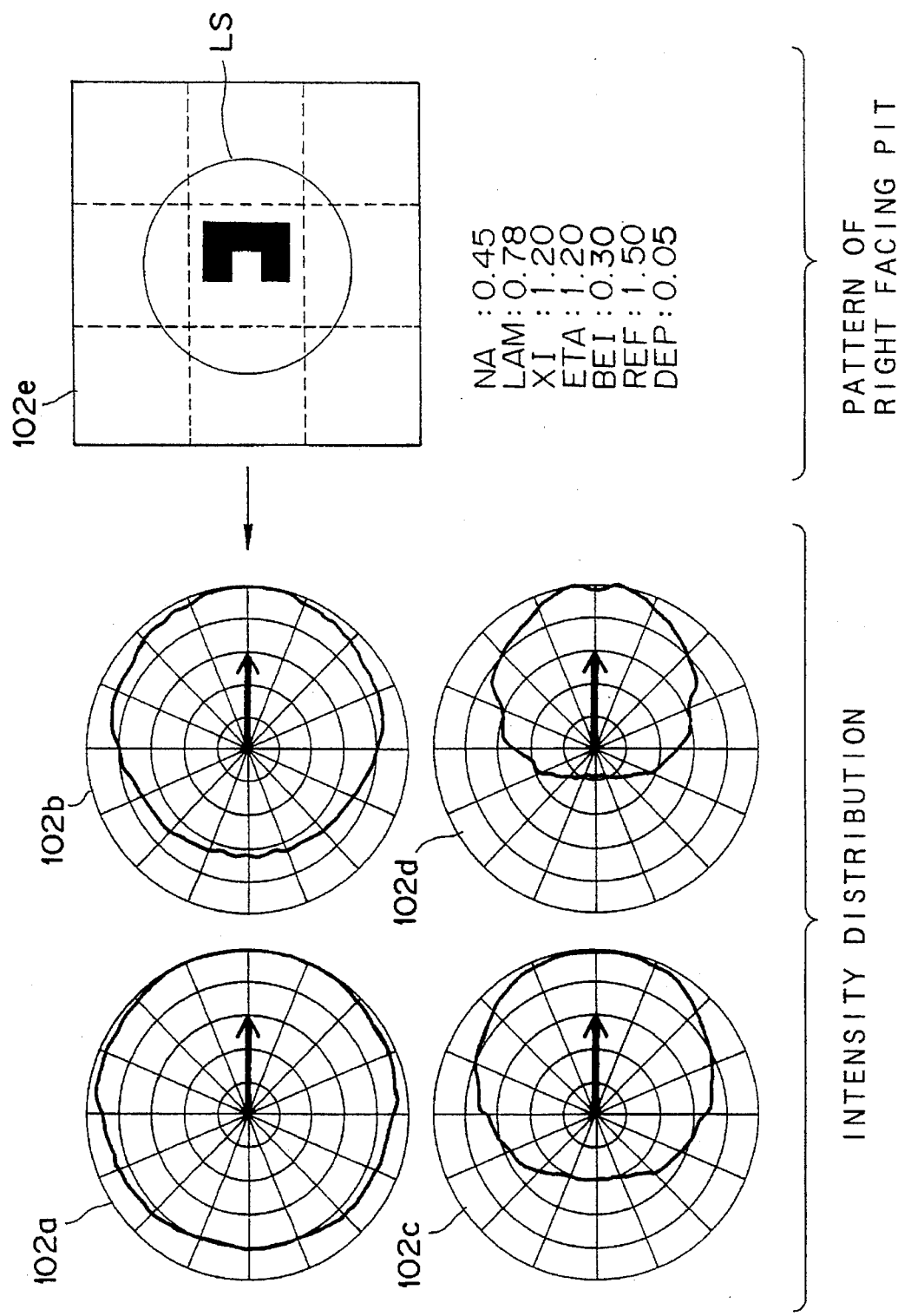
FIG. 12 is a diagram showing a distribution of the light intensity of the received light of every domain of the eight divided photodetector of the comparison example, in case of forming an information pit by five pit pieces.

FIG. 12 indicates the distribution of the intensity of the received light in case of forming a pattern 102e of a right facing information pit by five information pit pieces. It can be recognized that only rightward intensity is detected strongly as it goes from the domain AR1 (inner circumferential side) toward the domain AR4 (outer circumferential side), in the same manner as the case of FIG. 10.

Figure 13:
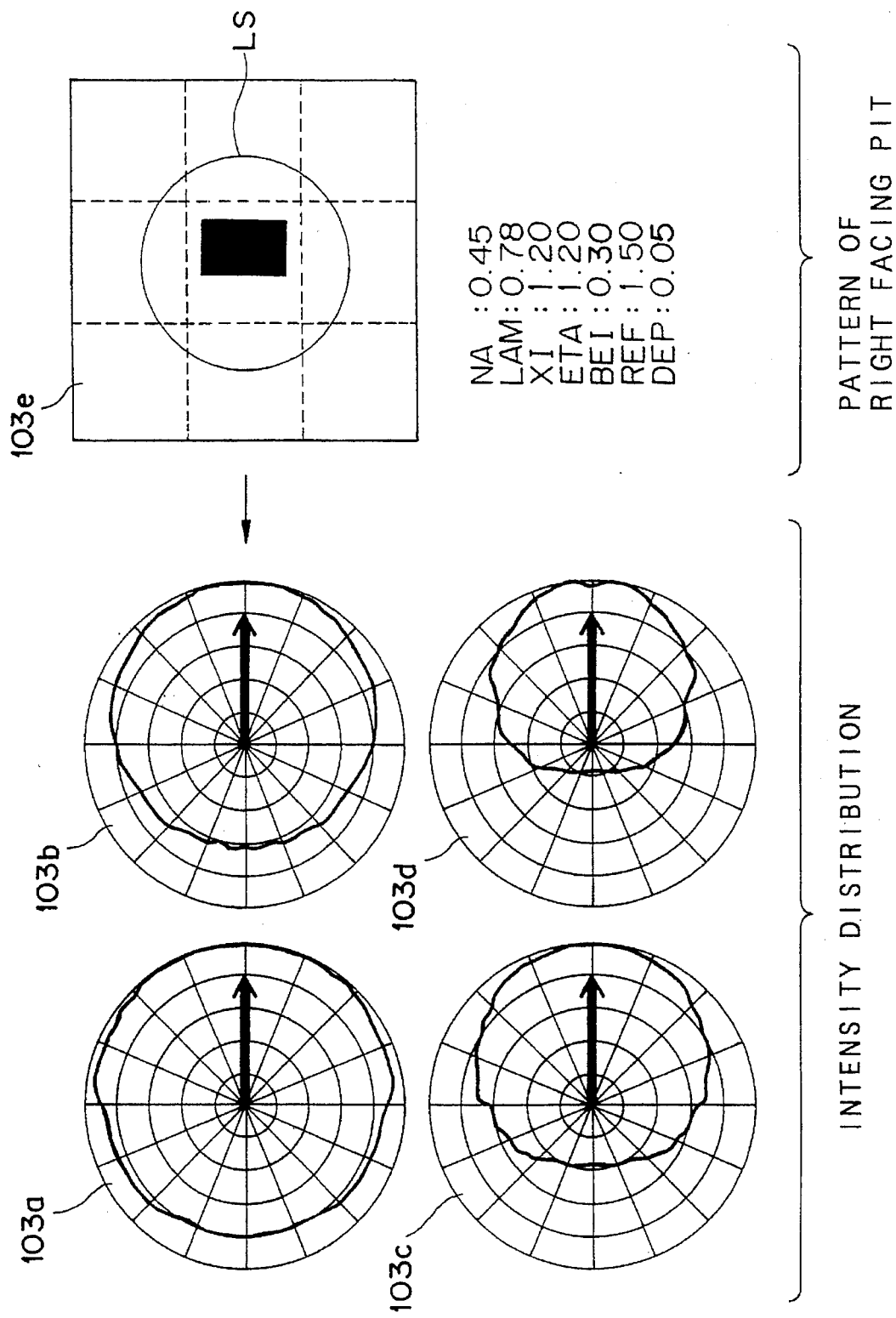
FIG. 13 is a diagram showing a distribution of the light intensity of the received light of every domain of the eight divided photodetector of the comparison example, in case of forming an information pit by six pit pieces.

FIG. 13 indicates the distribution of the intensity of the received light in case of forming a pattern 103e of a right facing information pit by six information pit pieces with using the center portion of the measures. It can be recognized that only rightward intensity is detected strongly as it goes from the domain AR1 (inner circumferential side) toward the domain AR4 (outer circumferential side), in the same manner as the case of FIG. 10.

The above results are the results as for the case that the information pit does not exist in the adjacent domain. Each of FIG. 14 and FIG. 15 indicates the distribution of the intensity of the received light as for the case that the information pits exist in the adjacent domains.

Figure 14:
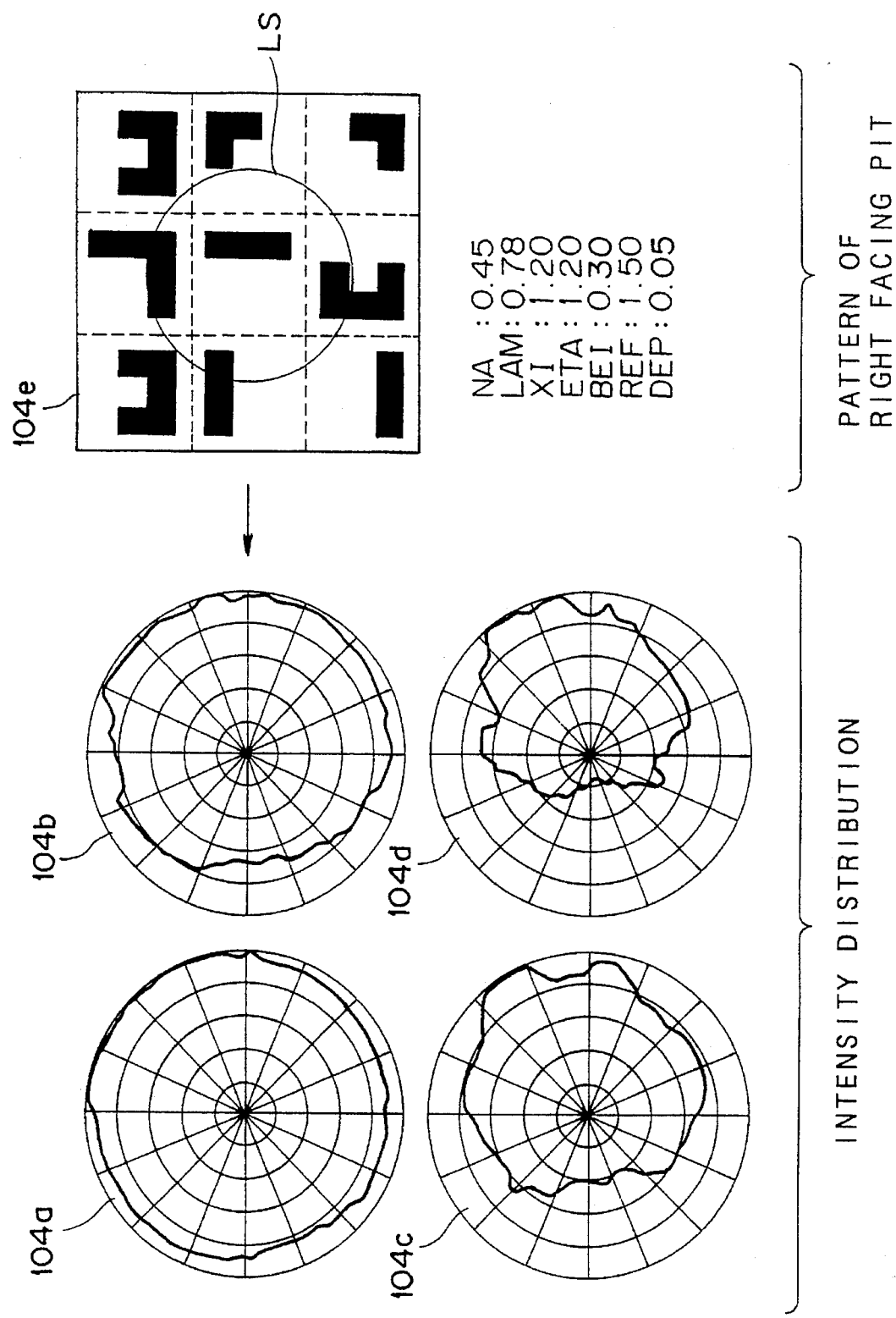
FIG. 14 is a diagram showing a distribution of the light intensity of the received light of every domain of the eight divided photodetector of the comparison example, in case of forming an information pit by three pit pieces and disposing information pits in the adjacent domains.
Figure 15:
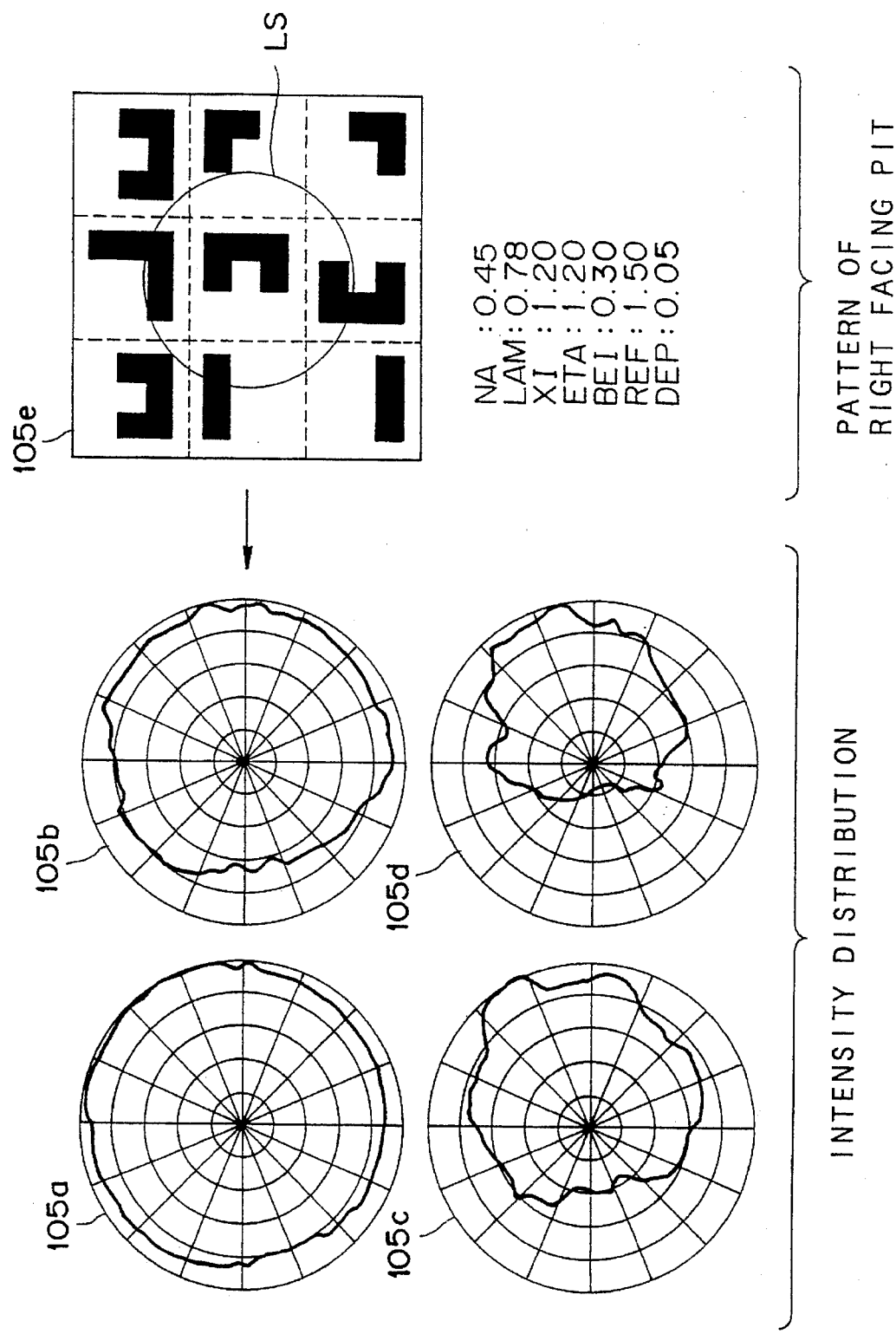
FIG. 15 is a diagram showing a distribution of the light intensity of the received light of every domain of the eight divided photodetector of the comparison example, in case of forming an information pit by five pit pieces and disposing information pits in the adjacent domains.

FIG. 14 indicates the distribution of the intensity of the received light in case of forming a pattern 104e of a right facing information pit by three information pit pieces and disposing Voluntary information pits in the adjacent domains. FIG. 15 indicates the distribution of the intensity of the received light in case of forming a pattern 105e of a right facing information pit by five information pit pieces and disposing voluntary information pits in the adjacent domains. It can be recognized in both cases that only rightward intensity is detected strongly as it goes from the domain AR1 (inner circumferential side) toward the domain AR4 (outer circumferential side), in the same manner as the case of FIG. 10.

From the above results, it is turned out that, in case that the information pit includes the direction (disposed position) as the information, in order to distinguish the correct directional information, it is enough to receive the only reflective reading light corresponding to the outer circumferential side of the light receiving surface of the light detecting apparatus for the reading light.

Thus, in order to confirm this, the light detection signal estimated to be outputted by the eight divided photodetector 30 of the present invention, is obtained by a calculation.

The relationship between the arrangement of the information pits and the reading light beam for the calculation, is the same as that (FIG. 7) used for the explanation of FIG. 8, the calculation results are shown in FIG. 16.

From these results,

1) In case of $\xi=1.25$ μm, since the absolute value |SUB'3| of SUB'3 is the minimum among the absolute values of SUB'1 to SUB'4 and since SUB'1>0, it is distinguished as a right facing information pit.

2) In case of $\xi=1.20$ μm, since the absolute value |SUB'4| of SUB'4 is the minimum among the absolute values of SUB'1 to SUB'4 and since SUB'1>0, it is distinguished as a right facing information pit.

3) In case of $\xi=1.15$ μm, since the absolute value |SUB'4| of SUB'4 is the minimum among the absolute values of SUB'1 to SUB'4 and since SUB'1>0, it is distinguished as a right facing information pit.

Therefore, it is turned out that it is possible to distinguish correctly in all cases, and that the eight divided photodetector 30 of the present invention is more suitable to detect the directional information of the information pit than the eight divided photodetector 30P.

Nextly, with reference to FIG. 17 to FIG. 21, the examples of the embodiment using the eight divided photodetector of the present invention will be explained.

Figure 17:
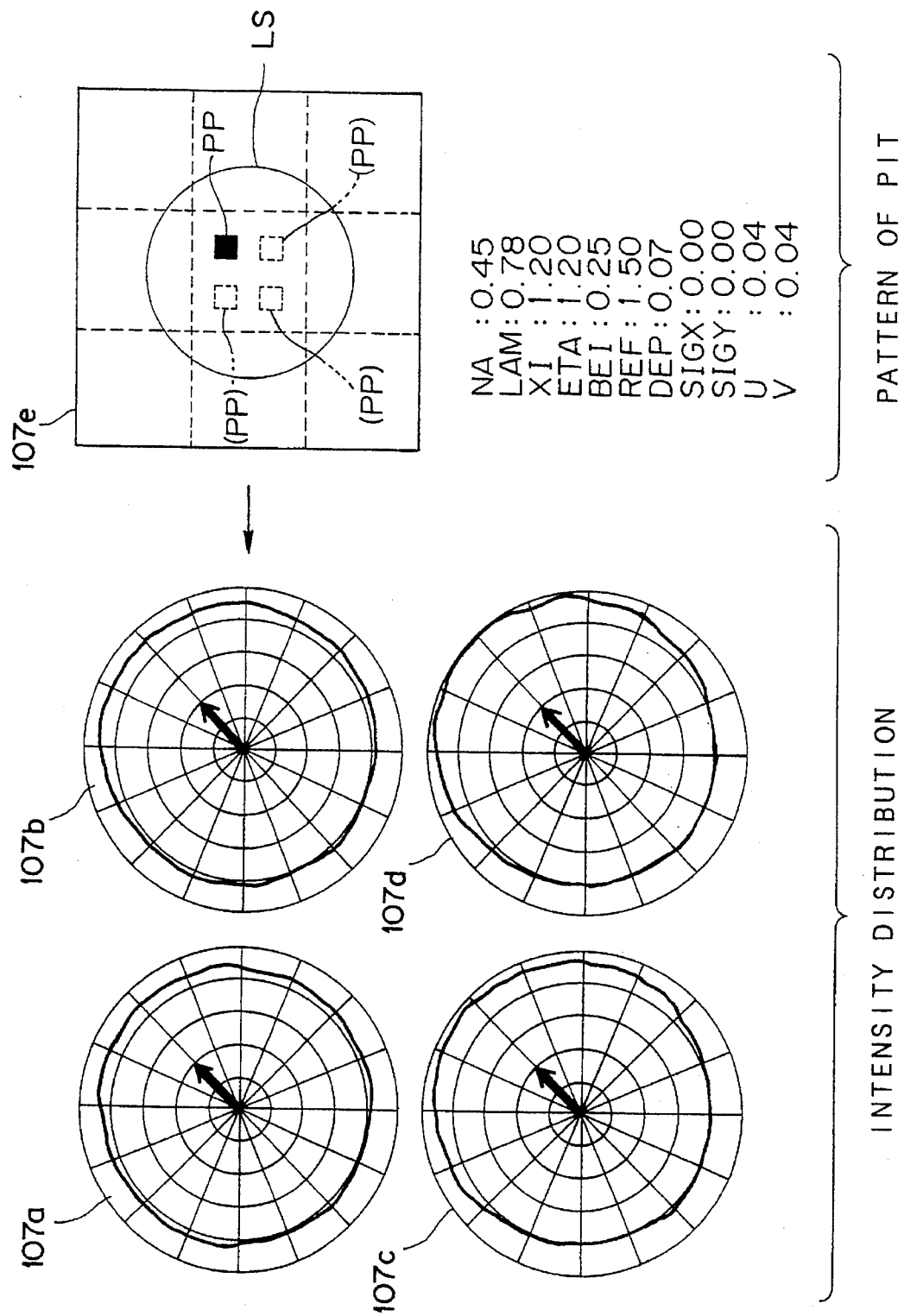
FIG. 17 is a diagram showing a distribution of the light intensity of the received light of the embodiment, in the in case of forming an information pit by one pit piece.

In this case, as shown by a pattern 107e of a pit in FIG. 17, the information pit is constituted by the combination of four pit pieces PP at the maximum.

Thus, 16 kinds of combinations can be considered as the kind of the information pit 1. Information with the information amount of 4 bits can be expressed by one pit.

FIG. 17 indicates the distribution of the light intensity of the received light in case of forming the pattern 107e of the information pit by one information pit piece.

In FIG. 17, a graph 107d indicates the distribution of the light intensity of the received light of the eight divided photodetector 30. It is shown that the intensity of the received light is zero at the center point and becomes strong toward the outer circumferential side. From this graph 107d, it can be easily recognized that the pit piece exists in the direction indicated by an arrow in the figure.

In addition, the distribution of the light intensity of the received light of the eight divided photodetector 30P is shown for reference. Namely, in FIG. 17, a graph 107a indicates the distribution of the light intensity of the received light in the domain AR1, a graph 107b indicates the distribution of the light intensity of the received light in the domain AR2, and a graph 107c indicates the distribution of the light intensity of the received light in the domain AR3. From these results, it is understood that the eight divided photodetector of the present invention is excellent.

Figure 18:
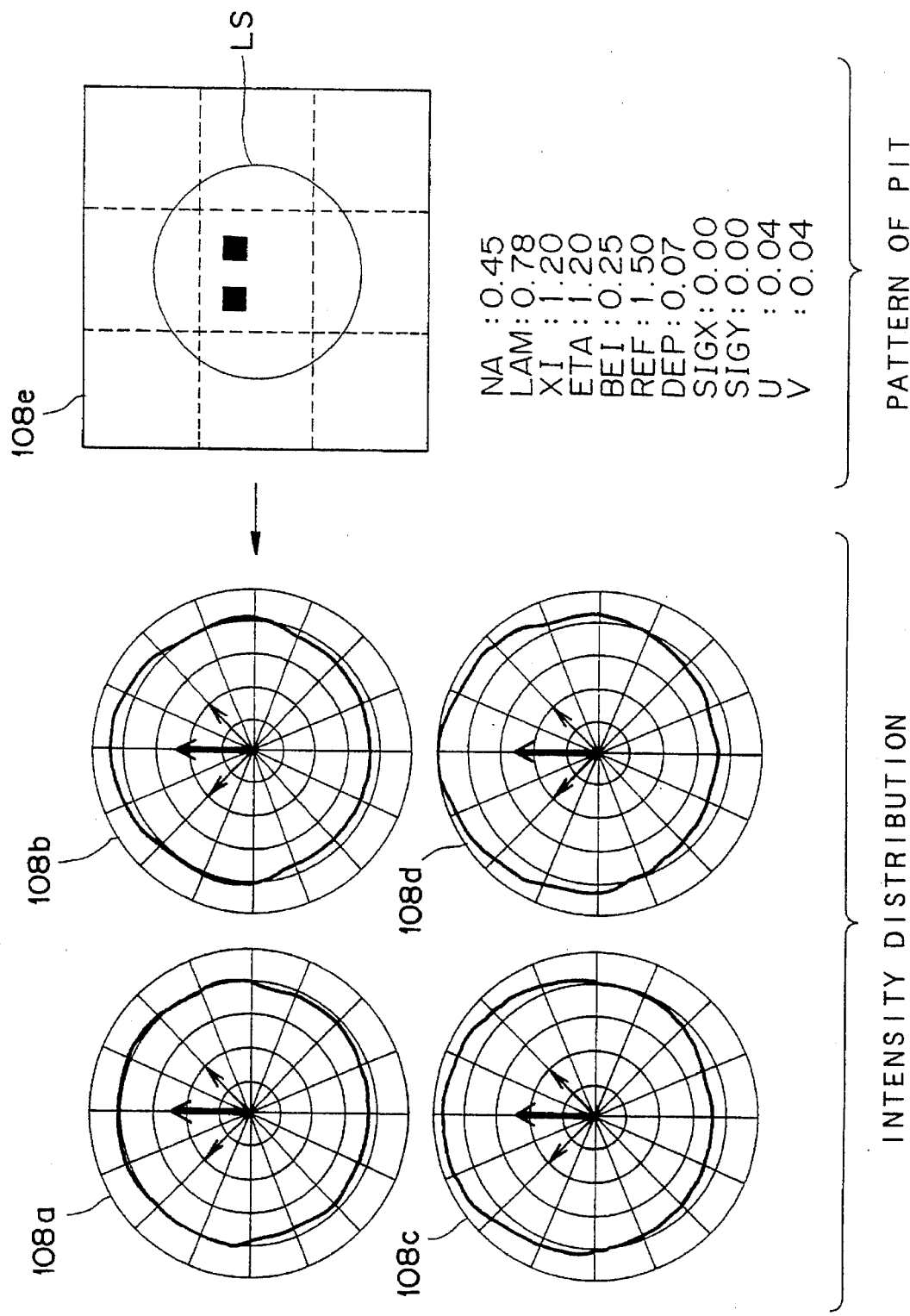
FIG. 18 is a diagram showing a distribution of the light intensity of the received light of the embodiment, in case of forming an information pit by two pit pieces arranged side by side.

FIG. 18 indicates the distribution of the light intensity of the received light in case of forming a pattern 108e of the information pit by two information pit pieces arranged side by side.

In FIG. 18, a graph 108d indicates the distribution of the light intensity of the received light of the eight divided photodetector 30. It can be easily recognized that the pit pieces respectively exist in the directions indicated by thin line arrows each indicating the intensity of the received light before they are combined into the direction indicated by a thick line arrow (the combined intensity of the received light).

In addition, the distribution of the light intensity of the received light of the eight divided photodetector 30P is shown for reference, in the same manner as the case of FIG. 17. Namely, in FIG. 18, a graph 108a indicates the distribution of the light intensity of the received light in the domain AR1, a graph 108b indicates the distribution of the light intensity of the received light in the domain AR2, and a graph 108c indicates the distribution of the light intensity of the received light in the domain AR3.

Figure 19:
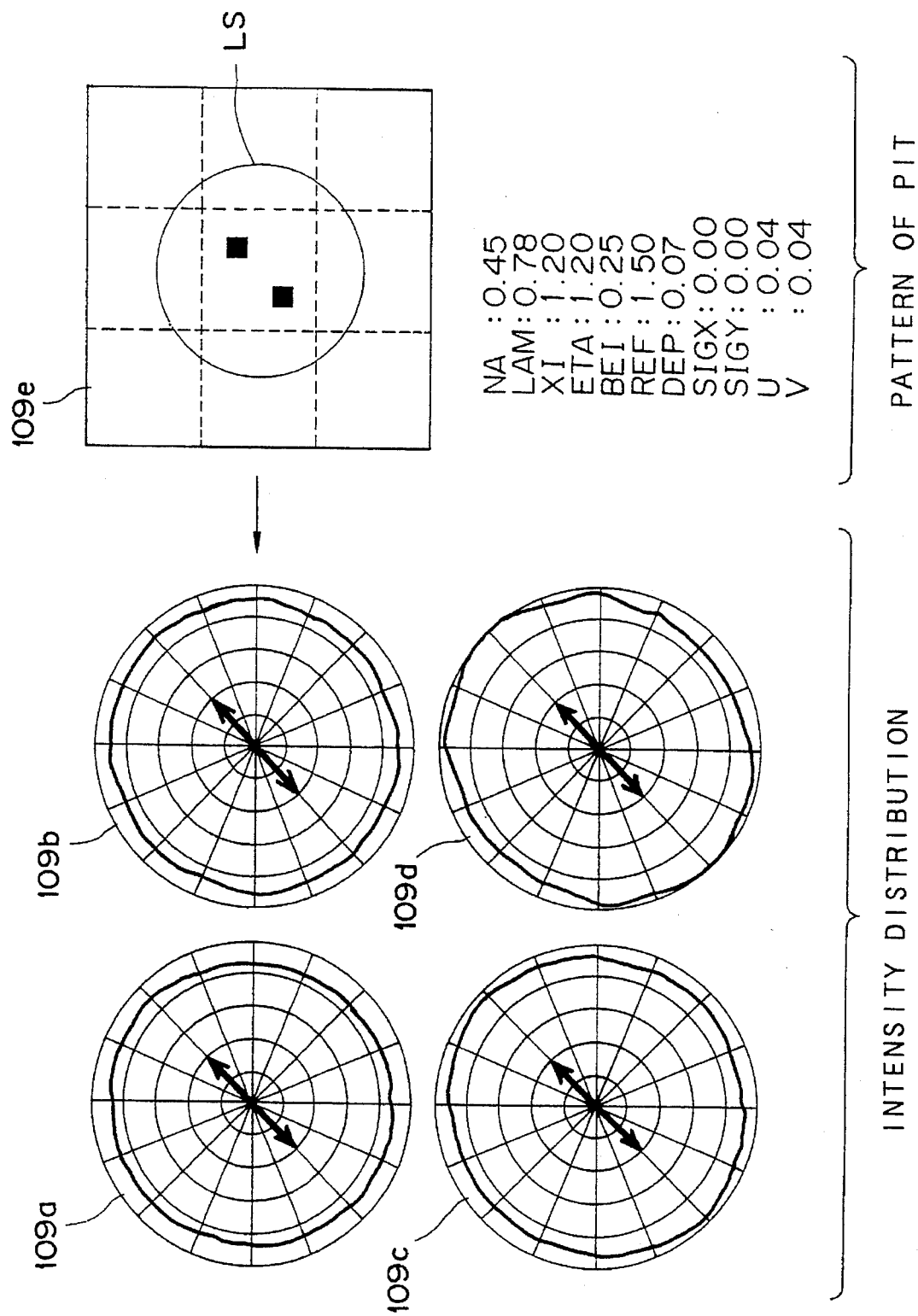
FIG. 19 is a diagram showing a distribution of the light intensity of the received light of the embodiment, in case of forming an information pit by two pit pieces arranged on a diagonal line.

FIG. 19 indicates the distribution of the light intensity of the received light in case of forming a pattern 109e of the information pit by two information pit pieces arranged on a diagonal line.

In FIG. 19, a graph 109d indicates the distribution of the light intensity of the received light of the eight divided photodetector 30. It can be easily recognized that the pit pieces respectively exist in the directions indicated by arrows by the fact that the curve of the intensity of the received light indicates an oval.

In addition, the distribution of the light intensity of the received light of the eight divided photodetector 30P is shown for reference, in the same manner as the case of FIG. 17. Namely, in FIG. 19, a graph 109a indicates the distribution of the light intensity of the received light in the domain AR1, a graph 109b indicates the distribution of the light intensity of the received light in the domain AR2, and a graph 109c indicates the distribution of the light intensity of the received light in the domain AR3.

Figure 20:
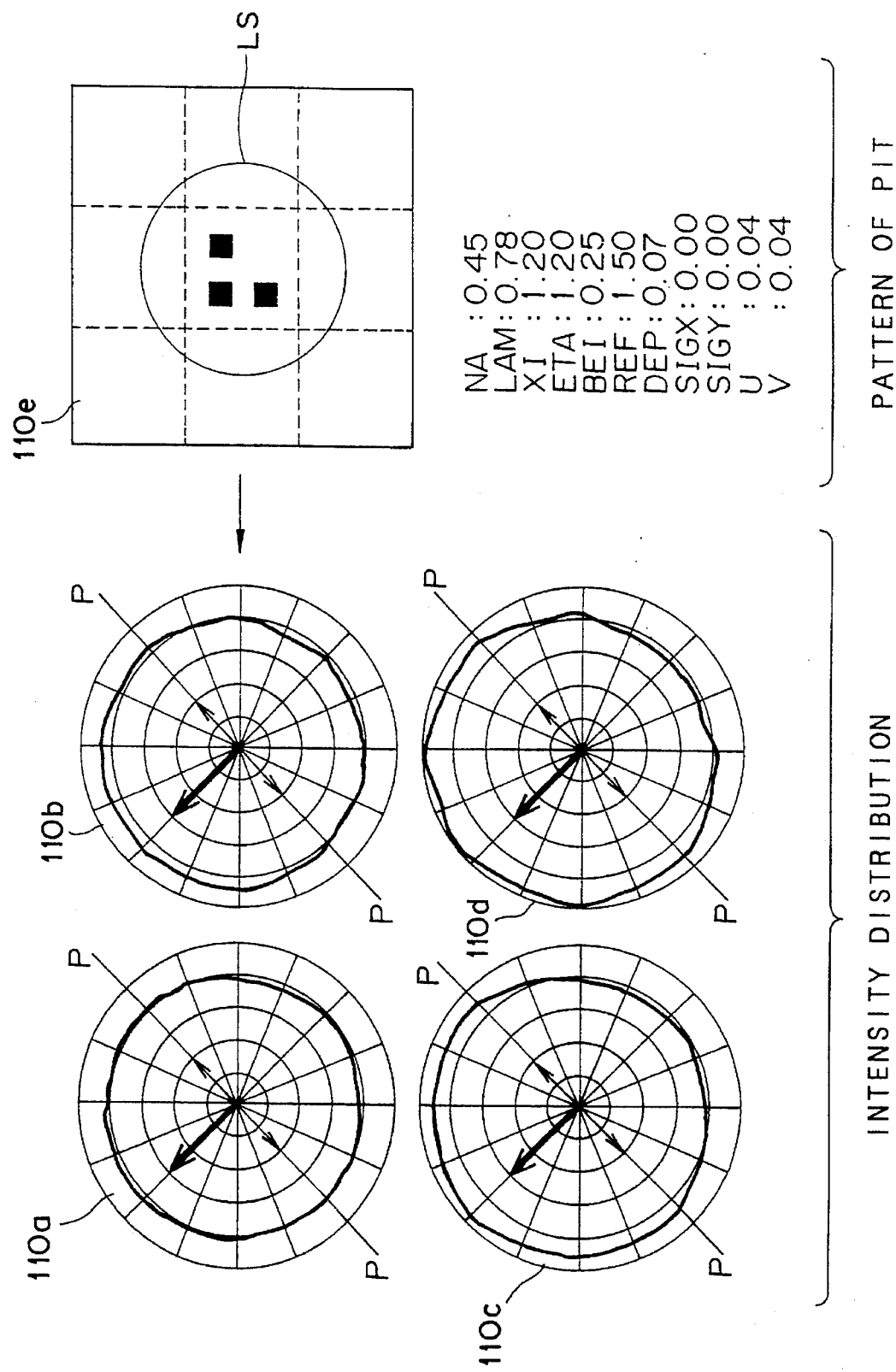
FIG. 20 is a diagram showing a distribution of the light intensity of the received light of the embodiment, in case of forming an information pit by three pit pieces.

FIG. 20 indicates the distribution of the light intensity of the received light in case of forming a pattern 110e of the information pit by three information pit pieces.

In FIG. 20, a graph 110d indicates the distribution of the light intensity of the received light of the eight divided photodetector 30. It can be easily recognized that the pit pieces respectively exist in the directions indicated by a thick line arrow and thin line arrows, by the fact that the intensity of the received light is strong in the direction indicated by the thick line arrow and that the curve of the intensity of the received light in the right lower half side of the division line P—P indicates an oval.

In addition, the distribution of the light intensity of the received light of the eight divided photodetector 30P is shown for reference, in the same manner as the case of FIG. 17. Namely, in FIG. 20, a graph 110a indicates the distribution of the light intensity of the received light in the domain AR1, a graph 110b indicates the distribution of the light intensity of the received light in the domain AR2, and a graph 110c indicates the distribution of the light intensity of the received light in the domain AR3.

Figure 21:
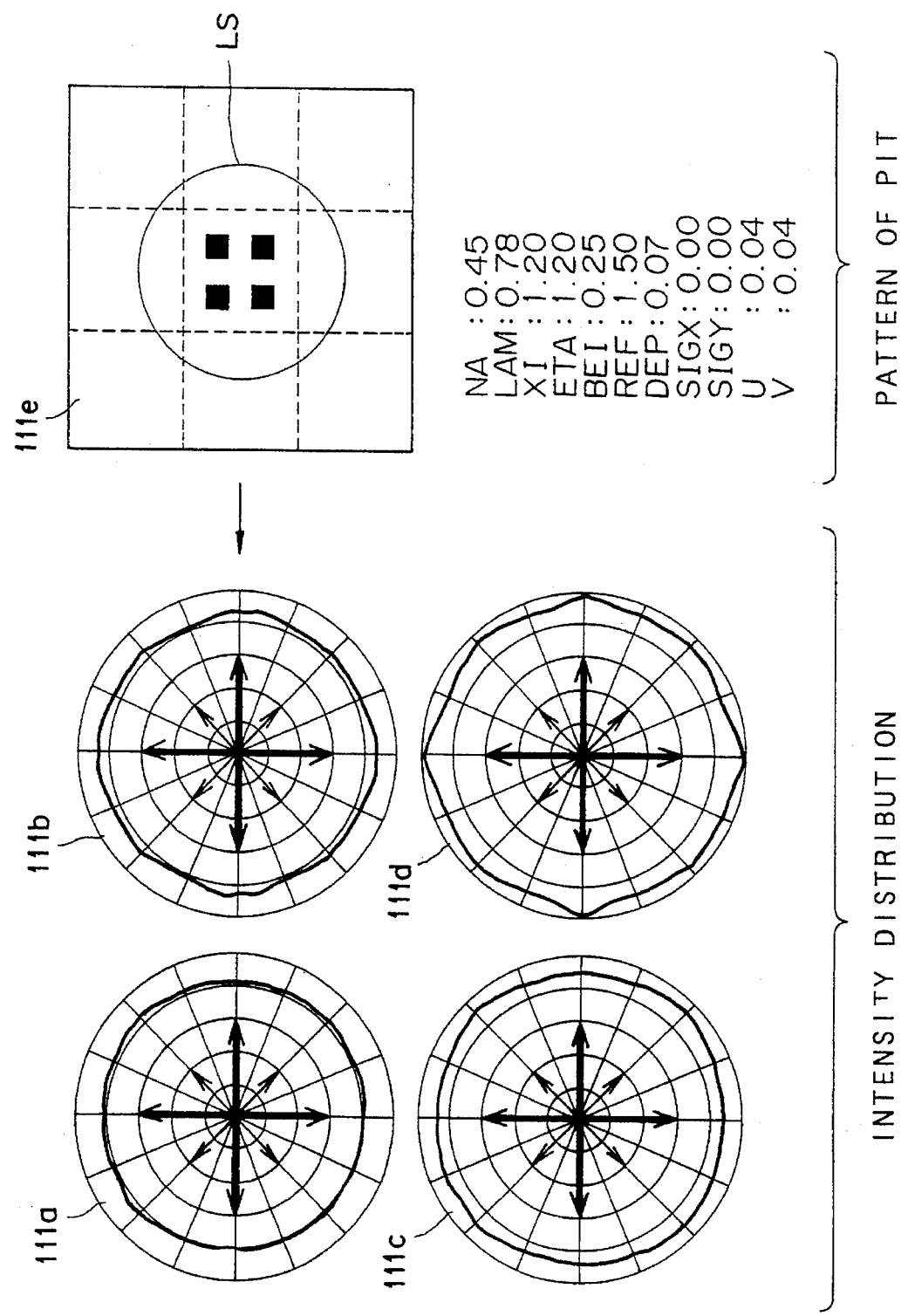
FIG. 21 is a diagram showing a distribution of the light intensity of the received light of the embodiment, in case of forming an information pit by four pit pieces.
Figure 22:
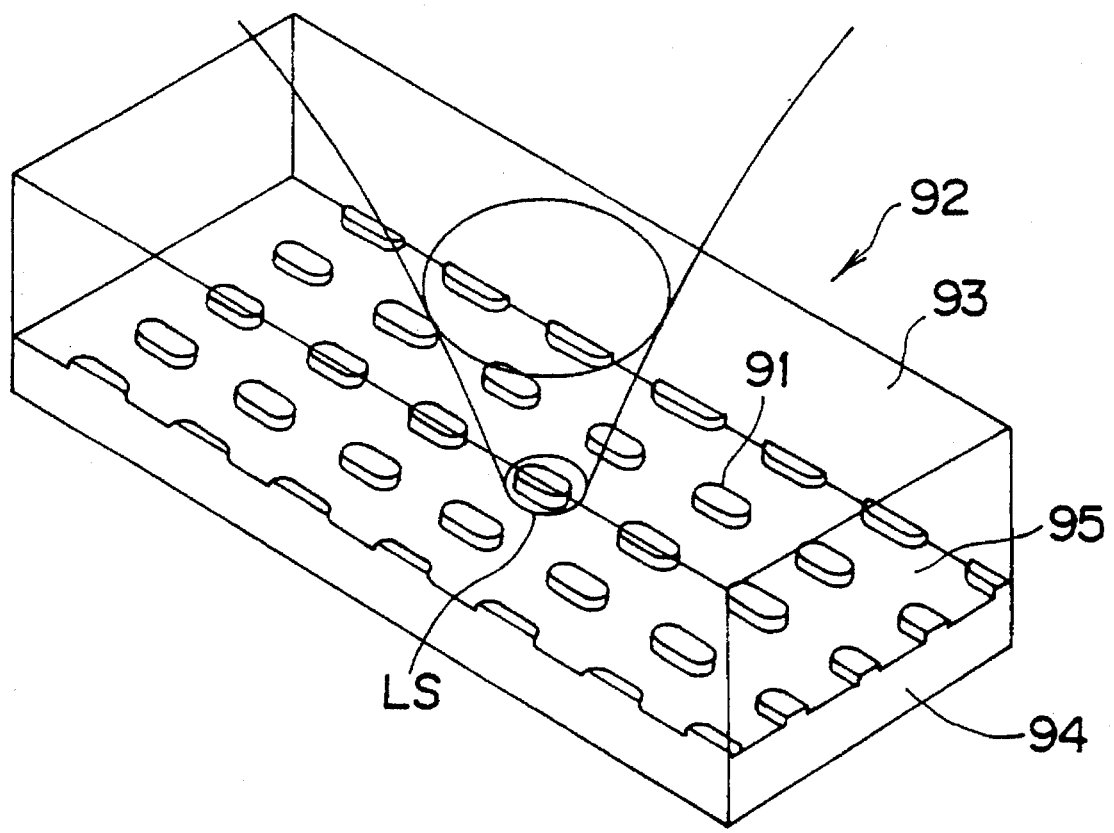
FIG. 22 is a diagram for explaining a construction and an operation principle of an optical disc in the related art.
Figure 23:
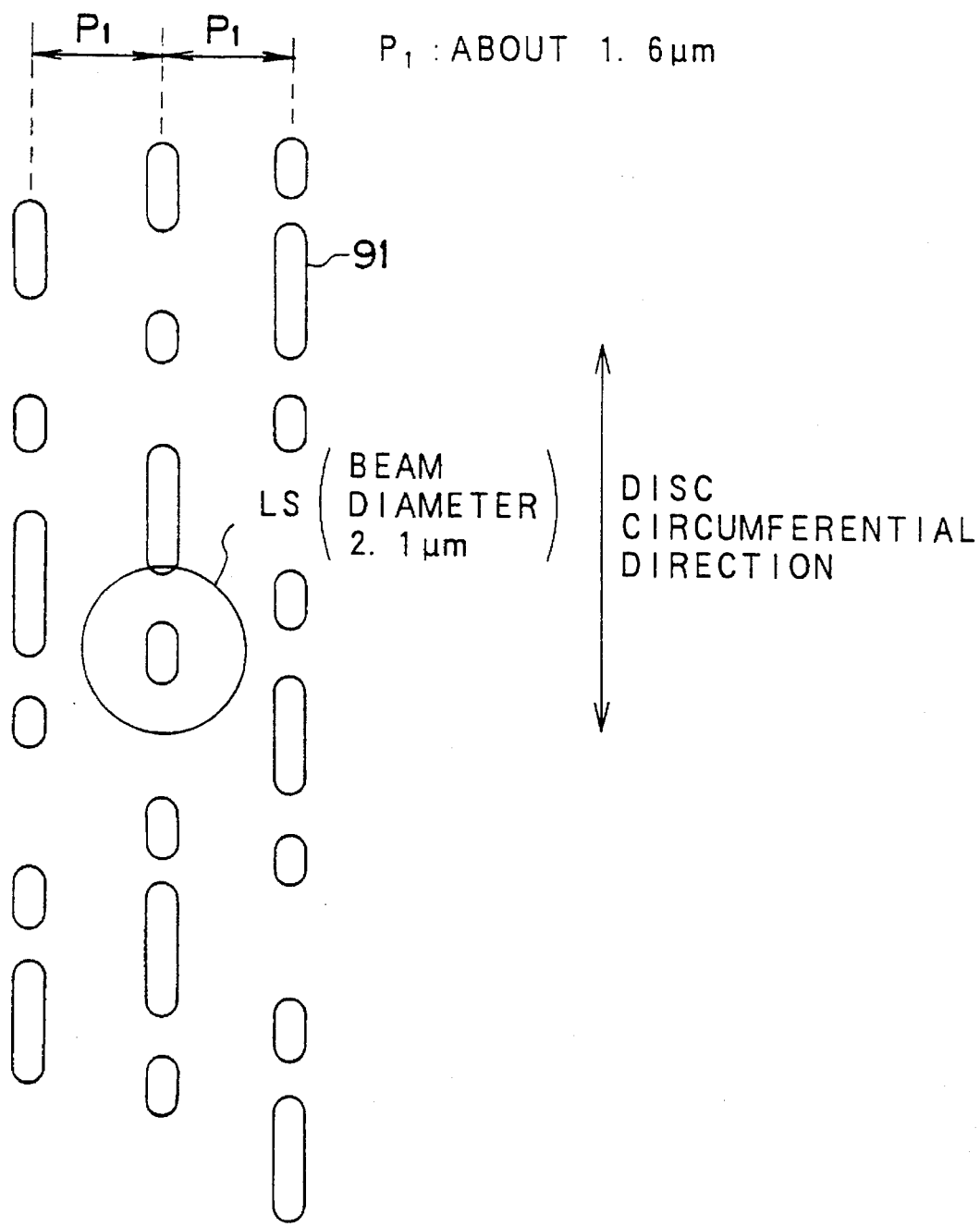
FIG. 23 is a diagram for explaining a track pitch of the optical disc in the related art.
Figure 24:
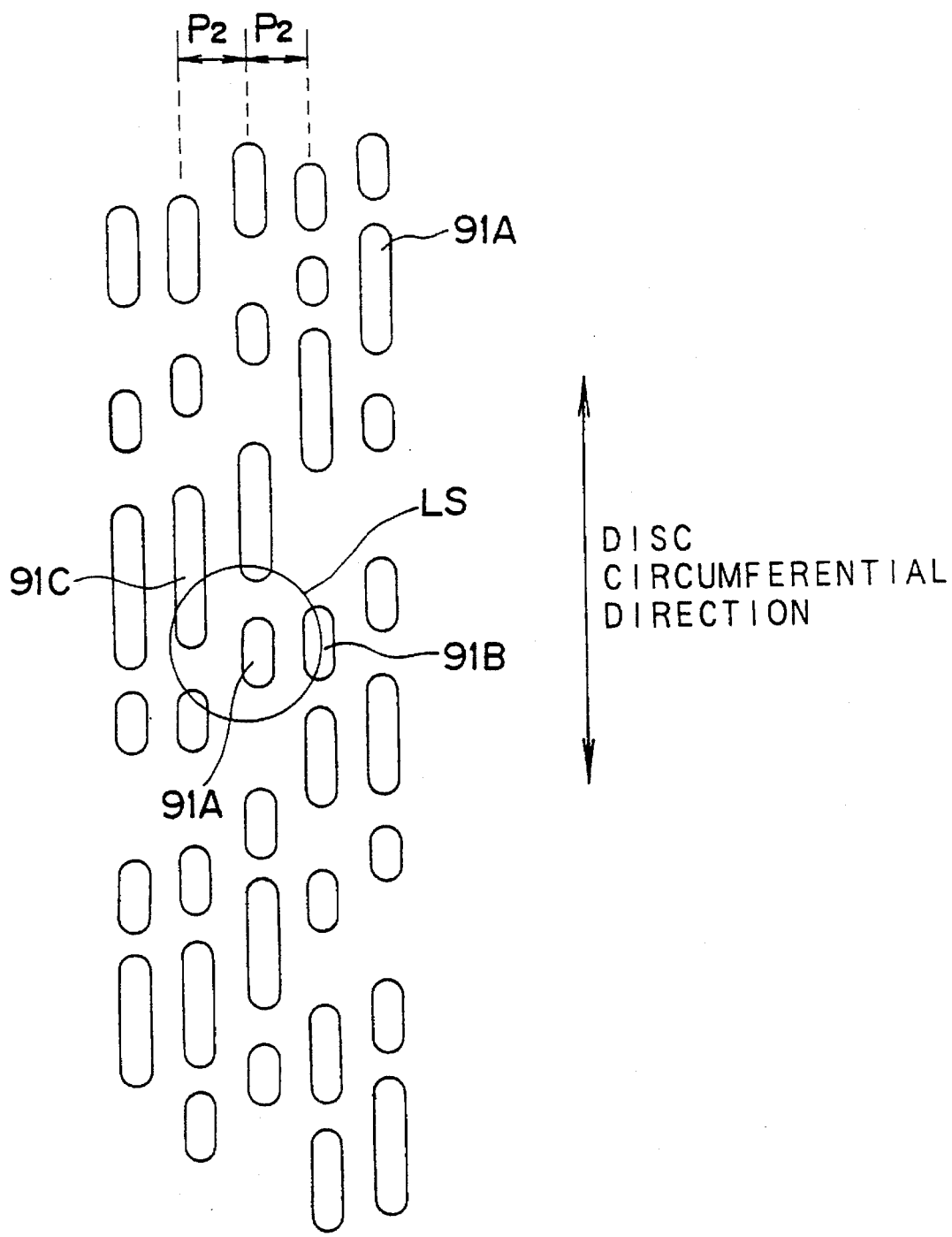
FIG. 24 is a diagram for explaining a case where the track pitch of the optical disc of FIG. 23, is simply reduced to be ½.
Figure 25:
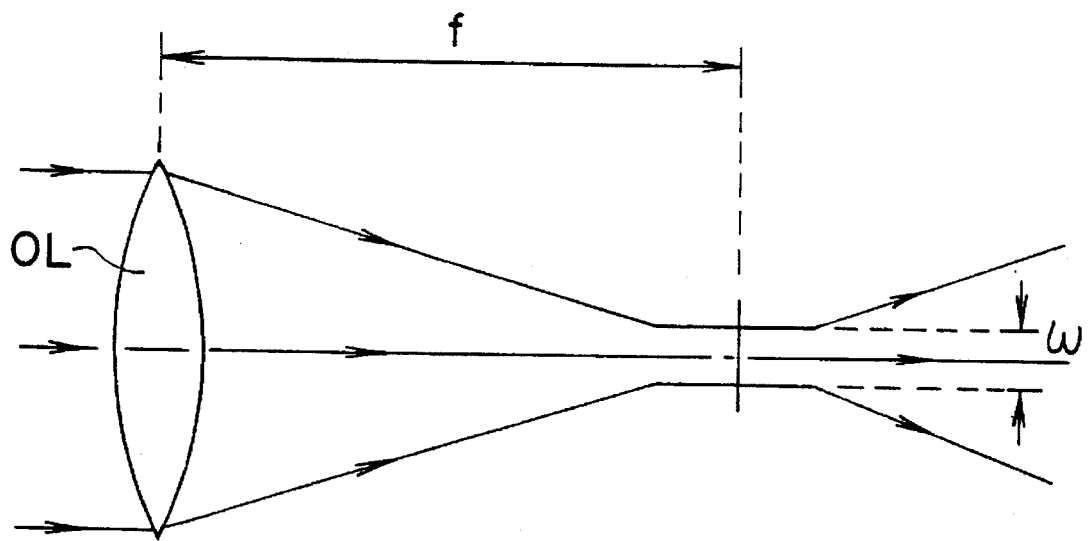
FIG. 25 is a diagram for explaining a relationship between an objective lens and a laser spot used for the optical disc.

FIG. 21 indicates the distribution of the light intensity of the received light in case of forming a pattern 111e of the information pit by four information pit pieces.

In FIG. 21, a graph 111d indicates the distribution of the light intensity of the received light of the eight divided photodetector 30. It can be easily recognized that the pit pieces respectively exist in the directions indicated by thin line arrows (four directions) which indicate the light intensity of the received light before they are combined into the direction indicated by the thick line arrow (the combined intensity of the received light), in the same manner as the case of FIG. 18.

In addition, the distribution of the light intensity of the received light of the eight divided photodetector 30P is shown for reference, in the same manner as the case of FIG. 17. Namely, in FIG. 21, a graph 111a indicates the distribution of the light intensity of the received light in the domain AR1, a graph 111b indicates the distribution of the light intensity of the received light in the domain AR2, and a graph 111c indicates the distribution of the light intensity of the received light in the domain AR3.

The above explained method of reading the signal, is one example, and it is possible to determine the arrangement pattern of the pit by use of other calculation method or pattern recognizing method etc.

Any optical disc can be employed as an optical disc to which the above embodiment is applied, as long as it is a pit type disc.

Furthermore, the information pit may be a convex shape or a concave shape with respect to the incident laser light.

Moreover, in the above explanation, the eight divided photodetector is used as a photodetector. However, the same effect can be obtained by use of a N divided photodetector (N=2, 3, . . . ).

As explained above in detail, according to the present embodiment, a reading light shaped in a spot is irradiated onto an information pit, a light detection signal is outputted on the basis of a reflective light which corresponds to an outer circumferential side domain, among a reflective light of the reading light shaped in the spot, which is projected onto an imaginary plane including a light receiving surface of a light detecting apparatus, and the record information is reproduced on the basis of the light detection signal. The information reproduction is performed without using the reflective light which corresponds to the center side domain of the light receiving surface of the light detecting apparatus, which is the most sensitive to the influence of the positional offset and the adjacent information pit. Consequently, an accurate information reproduction can be performed while restraining the influences of the positional offset and the adjacent information pit.

Further, according to the present embodiment, the light receiving surface for receiving the reflective light of the reading light, has the N (N: natural number not less than 2) pieces of divided light receiving surfaces, and the light detection signal is outputted on the basis of the reflective light which corresponds to the outer circumferential side domain of the reflective light. Thus, the light detection signal in which the influences of the positional offset and the adjacent information pit are reduced, can be outputted, and an accurate information reproduction can be performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of reproducing information of an optical disc, said optical disc having a recording surface on which a spiral track having a predetermined track pitch is formed, a plurality of information units being formed on said track each of which has a predetermined unit length in a circumferential direction and a radial direction of said optical disc respectively, the information being converted in a shape and a disposed position of an information pit, said information pit comprising an array of pit pieces which is formed in each of said plurality of information units, said method comprising the steps of:

irradiating a reading light to form a light spot on said information pit;

detecting only an outer light portion, which corresponds to an outer circumferential side domain, within a reflective light shaped in a spot from said information pit, which is projected on an imaginary plane including a light receiving surface of a light detecting apparatus to output a light detection signal indicating the detected outer light portion; and reproducing the information on the basis of the light detection signal to determine the pit pieces of said array that carry information.

2. A method according to claim 1, wherein, in the detecting step, the outer light portion is detected on the light receiving surface, which has an annular shape and is disposed coaxially with the reflective light shaped in the spot.

3. A method according to claim 1, wherein, in the detecting step, a plurality of equiangular portions of the outer light portion is separately detected on the light receiving surface.

4. A method according to claim 1, further comprising the step of computing a focusing error signal and a tracking error signal on the basis of the light detection signal.

5. A method of recording and reproducing information of an optical disc, comprising the steps of:

preparing an optical disc having a recording surface on which a spiral track having a predetermined track pitch is formed, a plurality of information units being formed on said track each of which has a predetermined unit length in a circumferential direction and a radial direction of said optical disc respectively;

recording information by converting the information into a shape and a disposed position of an information pit, which is formed in each of said plurality of information units, said information pit comprising an array of pit pieces;

irradiating a reading light to form a light spot on said information pit;

detecting only an outer light portion, which corresponds to an outer circumferential side domain, among a reflective light shaped in a spot from said information pit, which is projected on an imaginary plane including a light receiving surface of a light detecting apparatus to output a light detection signal indicating the detected outer light portion; and reproducing the information only on the basis of the light detection signal to determine the pit pieces of said array that carry information.

6. An apparatus for reproducing information of an optical disc, said optical disc having a recording surface on which a spiral track having a predetermined track pitch is formed, a plurality of information units being formed on said track each of which has a predetermined unit length in a circumferential direction and a radial direction of said optical disc respectively, the information being converted in a shape and a disposed position of an information pit, said information pit comprising an array of pit pieces which is formed in each of said plurality of information units, said apparatus comprising:

a light source for irradiating a reading light to form a light spot on said information pit;

a detection means having an N (N: natural number not less than 2) pieces of divided light receiving surfaces, for detecting only an outer light portion, which corresponds to an outer circumferential side domain, among a reflective light shaped in a spot from said information pit, which is projected on an imaginary plane including said divided light receiving surfaces to output a light detection signal indicating the detected outer light portion; and a reproduction means for reproducing the information only on the basis of the light detection signal to determine the pit pieces of said array that carry information.

7. An apparatus according to claim 6, wherein said divided light receiving surfaces have an annular shape and are disposed coaxially with the reflective light shaped in the spot.

8. An apparatus according to claim 6, wherein each of said divided light receiving surfaces has an equiangular shape.

* * * * *